US012657039B2

(12) United States Patent
Villan et al.

(10) Patent No.: US 12,657,039 B2
(45) Date of Patent: Jun. 16, 2026

(54) SYSTEMS, APPARATUSES, METHODS, AND COMPUTER PROGRAM PRODUCTS FOR INITIATING PERFORMANCE OF ONE OR MORE ITEM RECONFIGURATION ACTIONS

(71) Applicant: Honeywell International Inc., Charlotte, NC (US)

(72) Inventors: Ivan Borastero Villan, St. Germaine-en-Laye (FR); Sunil Anthon Bardeskar, Bangalore (IN); Ananda Vel Murugan Chandra Mohan, Madurai (IN); Chandrashekar Venkatappa Srinivas, Bangalore (IN); Douglas Duane Bird, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 90 days.

(21) Appl. No.: 18/911,747

(22) Filed: Oct. 10, 2024

(65) Prior Publication Data

US 2026/0056754 A1 Feb. 26, 2026

(30) Foreign Application Priority Data

Aug. 21, 2024 (IN) .............................. 202411063140

(51) Int. Cl.
*G06F 9/445* (2018.01)

(52) U.S. Cl.
CPC ................................ *G06F 9/44505* (2013.01)

(58) Field of Classification Search
CPC ................................................... G06F 1/44505
See application file for complete search history.

(56) References Cited

U.S. PATENT DOCUMENTS

| | | | | |
|---|---|---|---|---|
| 9,268,801 B2 * | 2/2016 | Mazoue | ................ | G06F 16/211 |
| 10,817,657 B2 * | 10/2020 | Akyamac | .............. | G06F 40/177 |
| 11,037,071 B1 * | 6/2021 | Tekiela | ................ | G06V 10/764 |
| 12,254,299 B2 * | 3/2025 | Sahar | ........................ | G06F 8/75 |
| 2025/0265541 A1 * | 8/2025 | Hepworth | ............ | G06Q 10/087 |

* cited by examiner

*Primary Examiner* — Raymond N Phan
(74) *Attorney, Agent, or Firm* — ALSTON & BIRD LLP

(57) ABSTRACT

A method provided herein includes receiving item feature data representative of a plurality of item configuration features associated with a plurality of items. In some embodiments, the method includes generating a field item feature structure. In some embodiments, the method includes identifying an item of the plurality of items using the field item feature structure and an item reconfiguration candidate machine learning component of a composite machine learning model. In some embodiments, the method includes generating item reconfiguration data for the item of the plurality of items using the field item feature structure and at least one of a plurality of reconfiguration machine learning components of the composite machine learning model. In some embodiments, the method includes initiating performance of one or more item reconfiguration actions based on the item reconfiguration data.

20 Claims, 6 Drawing Sheets

<u>500</u>

100

500

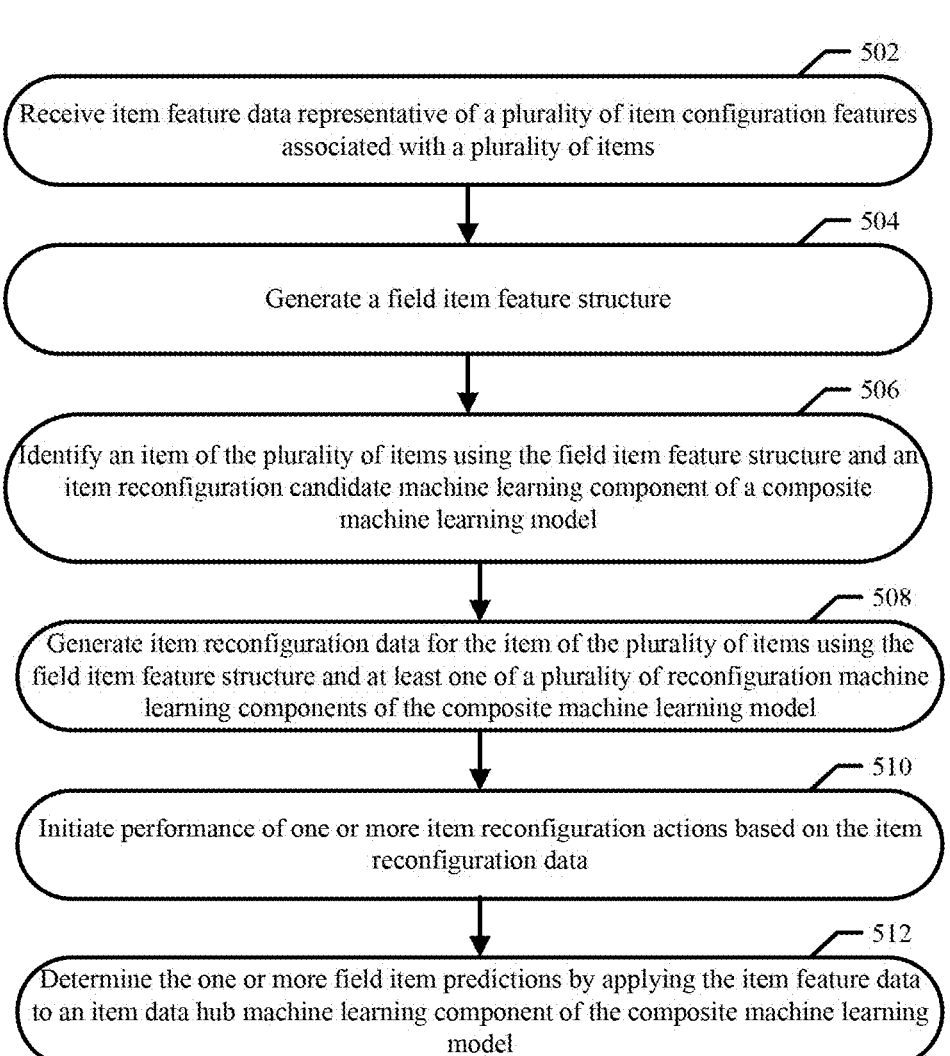

502

Receive item feature data representative of a plurality of item configuration features associated with a plurality of items

504

Generate a field item feature structure

506

Identify an item of the plurality of items using the field item feature structure and an item reconfiguration candidate machine learning component of a composite machine learning model

508

Generate item reconfiguration data for the item of the plurality of items using the field item feature structure and at least one of a plurality of reconfiguration machine learning components of the composite machine learning model

510

Initiate performance of one or more item reconfiguration actions based on the item reconfiguration data

512

Determine the one or more field item predictions by applying the item feature data to an item data hub machine learning component of the composite machine learning model

Generate an item reconfiguration interface component

604

Cause the item reconfiguration interface component to be rendered to an item reconfiguration interface

606

Cause an item inventory record to be modified

608

Cause an item manufacturing procedure to be modified

SYSTEMS, APPARATUSES, METHODS, AND COMPUTER PROGRAM PRODUCTS FOR INITIATING PERFORMANCE OF ONE OR MORE ITEM RECONFIGURATION ACTIONS

CROSS REFERENCE TO RELATED APPLICATIONS

This application claims the benefit of India Provisional Application No. 202411063140 filed Aug. 21, 2024, and entitled "SYSTEMS, APPARATUSES, METHODS, AND COMPUTER PROGRAM PRODUCTS FOR INITIATING PERFORMANCE OF ONE OR MORE ITEM RECONFIGURATION ACTIONS," which is hereby incorporated by reference in its entirety.

TECHNOLOGICAL FIELD

Embodiments of the present disclosure relate generally to systems, apparatuses, methods, and computer program products for initiating performance of one or more item reconfiguration actions.

BACKGROUND

Applicant has identified many technical challenges and difficulties associated with systems, apparatuses, methods, and computer program products for item reconfiguration. Through applied effort, ingenuity, and innovation, Applicant has solved problems related to systems, apparatuses, methods, and computer program products for item reconfiguration by developing solutions embodied in the present disclosure, which are described in detail below.

BRIEF SUMMARY

Various embodiments described herein relate to systems, apparatuses, methods, and computer program products for initiating performance of one or more item reconfiguration actions.

In accordance with one aspect of the disclosure, a method is provided. In some embodiments, the method includes receiving item feature data representative of a plurality of item configuration features associated with a plurality of items. In some embodiments, a first part of the item feature data is received from an internal item feature database and a second part of the item feature data is received from an external item feature database. In some embodiments, the method includes generating a field item feature structure. In some embodiments, the field item feature structure comprises at least a portion of the item feature data and one or more field item predictions. In some embodiments, the method includes identifying an item of the plurality of items using the field item feature structure and an item reconfiguration candidate machine learning component of a composite machine learning model. In some embodiments, the item of the plurality of items is a candidate for reconfiguration. In some embodiments, the method includes generating item reconfiguration data for the item of the plurality of items using the field item feature structure and at least one of a plurality of reconfiguration machine learning components of the composite machine learning model. In some embodiments, the method includes initiating performance of one or more item reconfiguration actions based on the item reconfiguration data.

In some embodiments, the method further includes determining the one or more field item predictions by applying the item feature data to an item data hub machine learning component of the composite machine learning model.

In some embodiments, the plurality of reconfiguration machine learning components comprises a first item material reconfiguration machine learning component configured to determine a predicted reconfiguration of the item.

In some embodiments, the predicted reconfiguration of the item comprises replacing a first component of the item with a second component.

In some embodiments, the first component is a resin component of the item.

In some embodiments, the plurality of reconfiguration machine learning components comprises a second item material reconfiguration machine learning component configured to determine a predicted reconfiguration of the item.

In some embodiments, the predicted reconfiguration of the item comprises replacing a first component of the item with a second component.

In some embodiments, the first component is a metal component of the item.

In some embodiments, the plurality of reconfiguration machine learning components comprises an item component standardization machine learning component configured to determine a predicted reconfiguration of the item.

In some embodiments, the predicted reconfiguration of the item comprises standardizing one or more components of the item.

In some embodiments, the plurality of reconfiguration machine learning components comprises an item matching machine learning component configured to determine a predicted reconfiguration of the item.

In some embodiments, the predicted reconfiguration of the item comprises standardizing one or more dimensions of the item.

In some embodiments, the plurality of reconfiguration machine learning components comprises an item formation machine learning component configured to determine a predicted reconfiguration of the item.

In some embodiments, the predicted reconfiguration of the item comprises altering one or more manufacturing operations associated with the item.

In some embodiments, the plurality of reconfiguration machine learning components comprises a static item component machine learning component configured to determine a predicted reconfiguration of the item.

In some embodiments, the predicted reconfiguration of the item comprises removing a static component of the item.

In some embodiments, initiating performance of the one or more item reconfiguration actions comprises generating an item reconfiguration interface component.

In some embodiments, the item reconfiguration interface component comprises one or more of the item feature data, the item reconfiguration data, or a visual representation of the item.

In some embodiments, initiating performance of the one or more item reconfiguration actions comprises causing the item reconfiguration interface component to be rendered to an item reconfiguration interface.

In some embodiments, initiating performance of the one or more item reconfiguration actions comprises causing an item inventory record to be modified.

In some embodiments, initiating performance of the one or more item reconfiguration actions comprises causing an item manufacturing procedure to be modified.

In accordance with another aspect of the disclosure, an apparatus is provided. In some embodiments, the apparatus includes memory and one or more processors communicatively coupled to the memory. In some embodiments, the one or more processors are configured to receive item feature data representative of a plurality of item configuration features associated with a plurality of items. In some embodiments, a first part of the item feature data is received from an internal item feature database and a second part of the item feature data is received from an external item feature database. In some embodiments, the one or more processors are configured to generate a field item feature structure. In some embodiments, the field item feature structure comprises at least a portion of the item feature data and one or more field item predictions. In some embodiments, the one or more processors are configured to identify an item of the plurality of items using the field item feature structure and an item reconfiguration candidate machine learning component of a composite machine learning model. In some embodiments, the item of the plurality of items is a candidate for reconfiguration. In some embodiments, the one or more processors are configured to generate item reconfiguration data for the item of the plurality of items using the field item feature structure and at least one of a plurality of reconfiguration machine learning components of the composite machine learning model. In some embodiments, the one or more processors are configured to initiate performance of one or more item reconfiguration actions based on the item reconfiguration data.

In some embodiments, the one or more processors are further configured to determine the one or more field item predictions by applying the item feature data to an item data hub machine learning component of the composite machine learning model.

In some embodiments, the plurality of reconfiguration machine learning components comprises a first item material reconfiguration machine learning component configured to determine a predicted reconfiguration of the item.

In some embodiments, the predicted reconfiguration of the item comprises replacing a first component of the item with a second component.

In some embodiments, the first component is a resin component of the item.

In some embodiments, the plurality of reconfiguration machine learning components comprises a second item material reconfiguration machine learning component configured to determine a predicted reconfiguration of the item.

In some embodiments, the predicted reconfiguration of the item comprises replacing a first component of the item with a second component.

In some embodiments, the first component is a metal component of the item.

In some embodiments, the plurality of reconfiguration machine learning components comprises an item component standardization machine learning component configured to determine a predicted reconfiguration of the item.

In some embodiments, the predicted reconfiguration of the item comprises standardizing one or more components of the item.

In some embodiments, the plurality of reconfiguration machine learning components comprises an item matching machine learning component configured to determine a predicted reconfiguration of the item.

In some embodiments, the predicted reconfiguration of the item comprises standardizing one or more dimensions of the item.

In some embodiments, the plurality of reconfiguration machine learning components comprises an item formation machine learning component configured to determine a predicted reconfiguration of the item.

In some embodiments, the predicted reconfiguration of the item comprises altering one or more manufacturing operations associated with the item.

In some embodiments, the plurality of reconfiguration machine learning components comprises a static item component machine learning component configured to determine a predicted reconfiguration of the item.

In some embodiments, the predicted reconfiguration of the item comprises removing a static component of the item.

In accordance with another aspect of the disclosure, a computer program product is provided. In some embodiments, the computer program product includes at least one non-transitory computer-readable storage medium having computer program code stored thereon. In some embodiments, the computer program code, in execution with at least one processor, configures the computer program product for receiving item feature data representative of a plurality of item configuration features associated with a plurality of items. In some embodiments, a first part of the item feature data is received from an internal item feature database and a second part of the item feature data is received from an external item feature database. In some embodiments, the computer program code, in execution with at least one processor, configures the computer program product for generating a field item feature structure. In some embodiments, the field item feature structure comprises at least a portion of the item feature data and one or more field item predictions. In some embodiments, the computer program code, in execution with at least one processor, configures the computer program product for identifying an item of the plurality of items using the field item feature structure and an item reconfiguration candidate machine learning component of a composite machine learning model. In some embodiments, the item of the plurality of items is a candidate for reconfiguration. In some embodiments, the computer program code, in execution with at least one processor, configures the computer program product for generating item reconfiguration data for the item of the plurality of items using the field item feature structure and at least one of a plurality of reconfiguration machine learning components of the composite machine learning model. In some embodiments, the computer program code, in execution with at least one processor, configures the computer program product for initiating performance of one or more item reconfiguration actions based on the item reconfiguration data.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Figure 1:
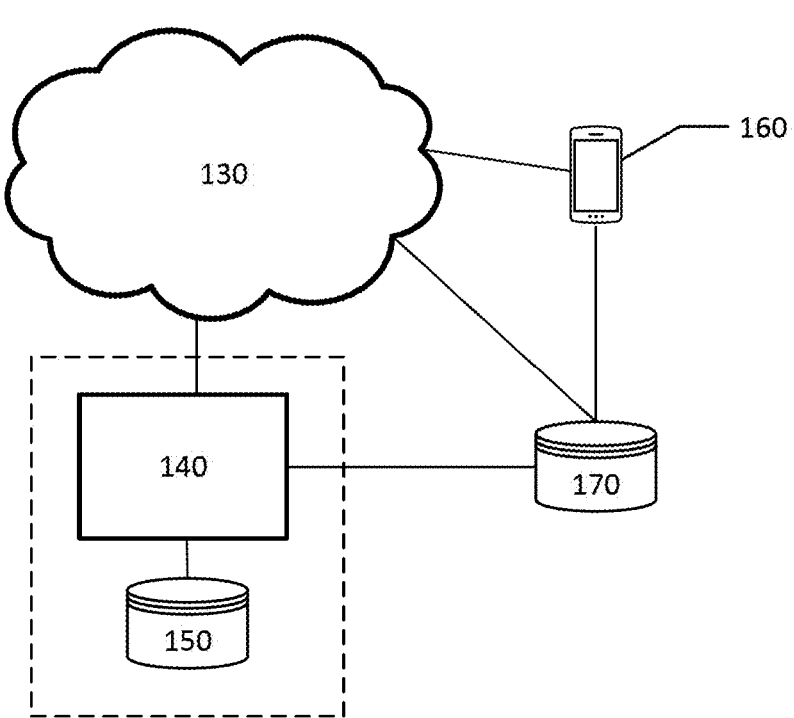
Figure 2:
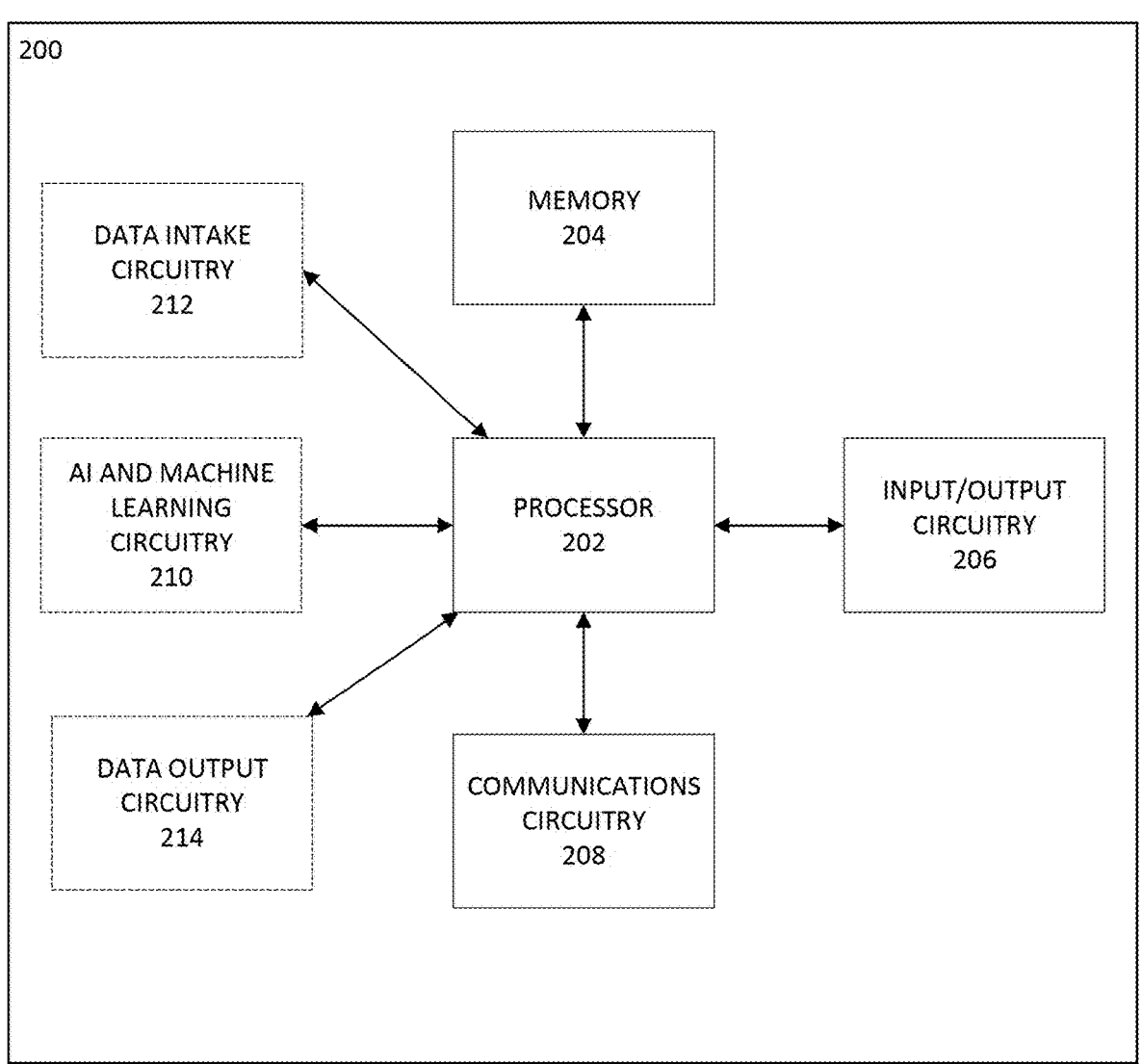
Figure 3:
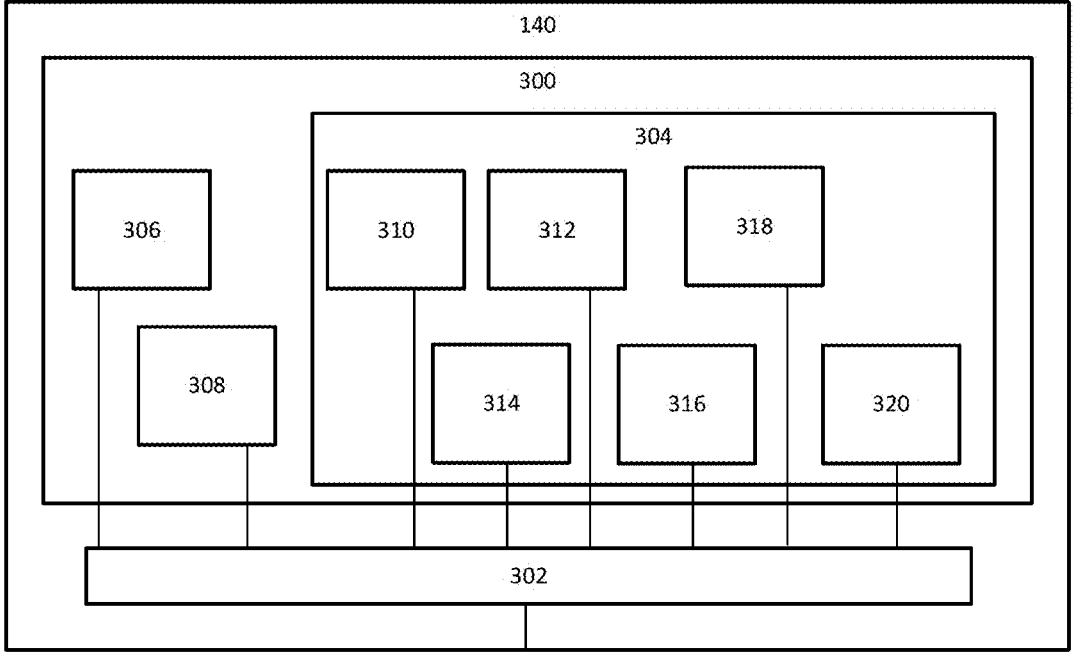
Figure 4:
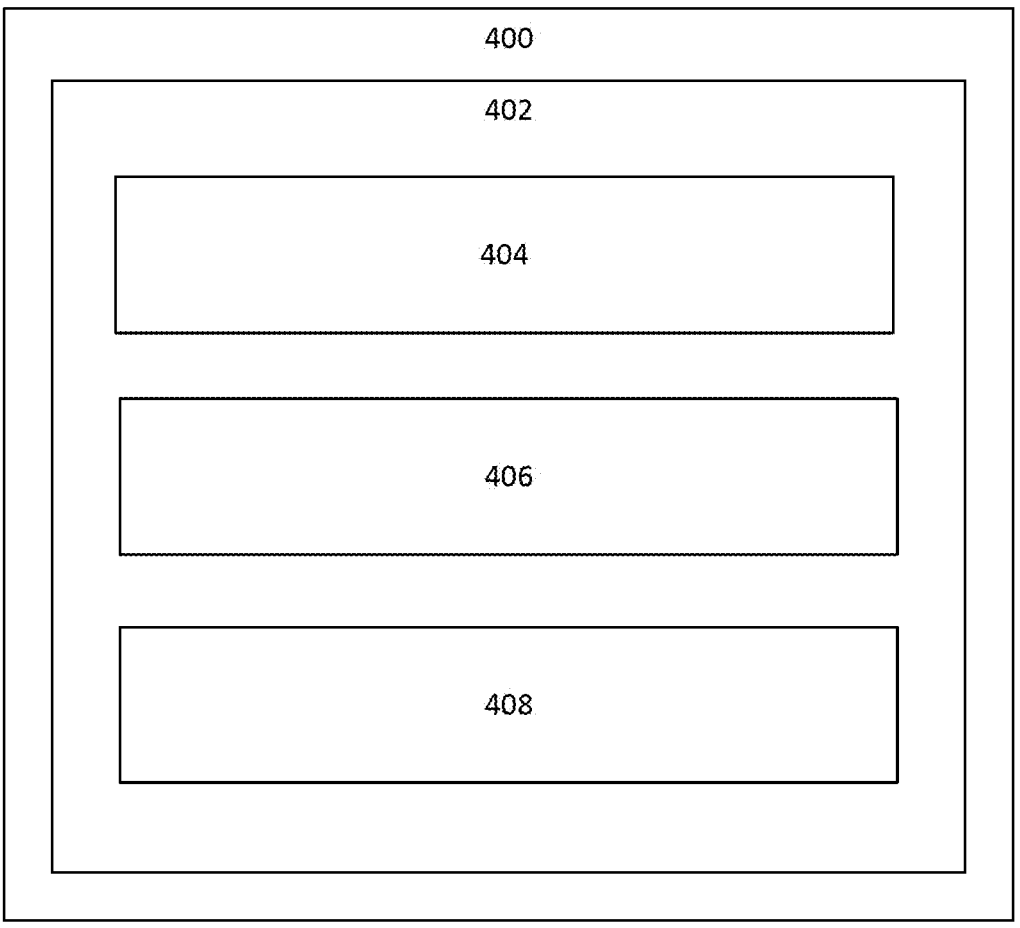
Figure 6:
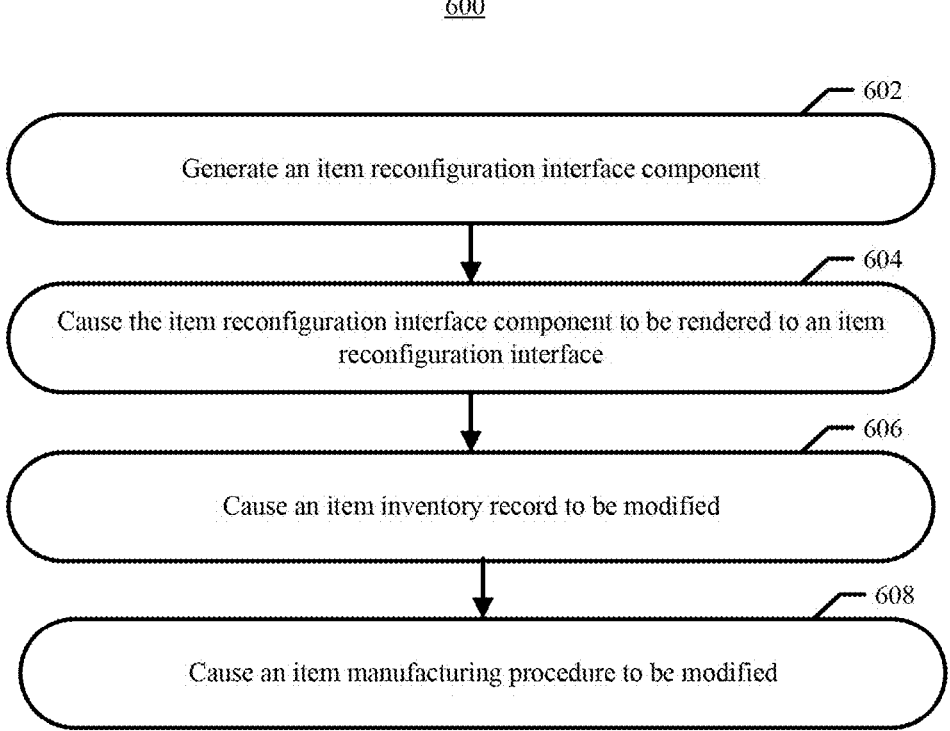

Having thus described certain example embodiments of the present disclosure in general terms, reference will now be made to the accompanying drawings, which are not necessarily drawn to scale, and wherein:

FIG. 1 illustrates an exemplary block diagram of an environment in which embodiments of the present disclosure may operate;

FIG. 2 illustrates an exemplary block diagram of an example apparatus that may be specially configured in accordance with one or more embodiments of the present disclosure;

FIG. 3 illustrates an architecture of an example item reconfiguration device in accordance with one or more embodiments of the present disclosure;

FIG. 4 illustrates an example interface in accordance with one or more embodiments of the present disclosure;

FIG. 5 illustrates a flowchart of an example method in accordance with one or more embodiments of the present disclosure; and FIG. 6 illustrates a flowchart of an example method in accordance with one or more embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments or it may be excluded.

The use of the term "circuitry" as used herein with respect to components of a system or an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, communication circuitry, input/output circuitry, and the like. In some embodiments, other elements may provide or supplement the functionality of particular circuitry. Alternatively, or additionally, in some embodiments, other elements of a system and/or apparatus described herein may provide or supplement the functionality of another particular set of circuitry. For example, a processor may provide processing functionality to any of the sets of circuitry, a memory may provide storage functionality to any of the sets of circuitry, communications circuitry may provide network interface functionality to any of the sets of circuitry, and/or the like.

Overview

Example embodiments disclosed herein address technical problems associated with systems, apparatuses, methods, and computer program products for item reconfiguration. As would be understood by one skilled in the field to which this disclosure pertains, there are numerous example scenarios in which systems, apparatuses, methods, and computer program products for item reconfiguration are desirable.

In many applications, it may be desirable to use systems, apparatuses, methods, and computer program products for item reconfiguration. For example, it may be desirable to use systems, apparatuses, methods, and computer program products for item reconfiguration to modify items such that items are more efficient, lighter, and have greater functionality. As another example, it may be desirable to use systems, apparatuses, methods, and computer program products for item reconfiguration in order to streamline manufacturing operations of an item. As another example, may be desirable to use systems, apparatuses, methods, and computer program products for item reconfiguration in order to implement an item in an available field space.

Example solutions for item reconfiguration include using one or more databases and/or one or more computing devices to perform item reconfiguration. However, such example solutions are inefficient, reactive, simplistic, and technically deficient. For example, such example solutions are inefficient because such example solutions do not use a composite machine learning model that includes a plurality of specifically configured components for performing particular functions of item reconfiguration. As a result, such example solutions cause computing devices and databases to suffer from high latency, consume excessive processing power, and consume excessive memory. As another example, such example solutions are reactive because such example solutions are unable to automatically implement item reconfiguration actions. In this regard, such example solutions are unable to automatically implement item related actions that automatically cause an item inventory record to be modified and/or an item manufacturing procedure to be modified. As another example, such example solutions are simplistic because such example solutions are unable to generate item reconfiguration data. As another example, such example solutions are technically deficient because such example solutions are unable to determine and/or predict one or more field item predictions because determining field item predictions often requires capabilities beyond inner joins, outer joins, right joins, and/or left joins provided by such example solutions. For example, such example solutions that use an SQL database are unable to determine and/or predict one or more field item predictions. Accordingly, there is a need for systems, apparatuses, methods, and computer program products that are able to perform item reconfiguration in an efficient, a proactive, a sophisticated, and a technically sufficient manner.

Thus, to address these and/or other issues related to such example solutions, example systems, apparatuses, methods, and computer program products for initiating performance of one or more item reconfiguration actions are disclosed herein. For example, an embodiment in this disclosure, described in greater detail below, includes a method that includes receiving item feature data representative of a plurality of item configuration features associated with a plurality of items. In some embodiments, a first part of the item feature data is received from an internal item feature database and a second part of the item feature data is received from an external item feature database. In some embodiments, the method includes generating a field item feature structure. In some embodiments, the field item feature structure comprises at least a portion of the item feature data and one or more field item predictions. In some embodiments, the method includes identifying an item of the plurality of items using the field item feature structure and an item reconfiguration candidate machine learning component of a composite machine learning model. In some embodiments, the item of the plurality of items is a candidate for reconfiguration. In some embodiments, the method includes generating item reconfiguration data for the item of the plurality of items using the field item feature structure and at least one of a plurality of reconfiguration machine learning components of the composite machine learning model. In some embodiments, the method includes initiating performance of one or more item reconfiguration actions based on the item reconfiguration data. Accordingly, the systems, apparatuses, methods, and computer program products provided herein enable item reconfiguration in an efficient, a proactive, and a technically sufficient manner.

Example Systems and Apparatuses

Embodiments of the present disclosure herein include systems, apparatuses, methods, and computer program products configured for initiating performance of one or more item reconfiguration actions. For example, embodiments of the present disclosure herein may include systems, apparatuses, methods, and computer program products configured for item reconfiguration using value engineering (VE) and/ or component engineering (CE). In some embodiments, value engineering and/or component engineering includes facilitating the lifecycle management of an item. It should be readily appreciated that the embodiments of the apparatus, systems, methods, and computer program product described herein may be configured in various additional and alternative manners in addition to those expressly described herein.

FIG. 1 illustrates an exemplary block diagram of an environment in which embodiments of the present disclosure may operate. In some embodiments, the environment 100 includes an item reconfiguration device 140. In some embodiments, the item reconfiguration device 140 is electronically and/or communicatively coupled to an internal item feature database 150, an external item feature database 170, and/or a user device 160. The item reconfiguration device 140 may be located remotely from the internal item feature database 150, the external item feature database 170, and/or the user device 160. In some embodiments, the item reconfiguration device 140 may be located in a remote cloud server and electronically and/or communicatively coupled to the internal item feature database 150, the external item feature database 170, and/or user device 160 via at least a network 130. In some embodiments, the item reconfiguration device 140 is configured via hardware, software, firmware, and/or a combination thereof, to perform data intake of one or more types of data, such as item feature data and/or the like.

Additionally, or alternatively, in some embodiments, the item reconfiguration device 140 is configured via hardware, software, firmware, and/or a combination thereof, to generate and/or transmit command(s) that control, adjust, or otherwise impact operations of the one or more of the internal item feature database 150, the external item feature database 170, the item reconfiguration device 140, and/or the user device 160. For example, the item reconfiguration device 140 may be configured to initiate performance of one or more item reconfiguration actions. Additionally, or alternatively, in some embodiments, the item reconfiguration device 140 is configured via hardware, software, firmware, and/or a combination thereof, to perform data reporting, provide data, and/or other data output process(es) associated with monitoring or otherwise analyzing operations of one or more of the one or more of the internal item feature database 150, the external item feature database 170, the item reconfiguration device 140, and/or the user device 160. For example, in various embodiments, the item reconfiguration device 140 may be configured to execute and/or perform one or more operations and/or functions described herein.

The user device 160 may be associated with users of the item reconfiguration device 140. In various embodiments, the item reconfiguration device 140 may generate and/or transmit a message, alert, or indication to a user via the user device 160. Additionally, or alternatively, the user device 160 may be utilized by a user to remotely access the item reconfiguration device 140. This may be by, for example, an application operating on the user device 160.

The external item feature database 170 may be configured to receive, store, and/or transmit data. In various embodiments, the external item feature database 170 may be associated with data associated with the item reconfiguration device 140, the internal item feature database 150, and/or the user device 160. Additionally, or alternatively, in some embodiments the external item feature database 170 stores user inputted data. The external item feature database 170 may be located remotely from the user device 160, the internal item feature database 150, and/or the item reconfiguration device 140, in proximity of the user device 160 and/or the item reconfiguration device 140, the internal item feature database 150, and/or within the user device 160, the internal item feature database 150, and/or the item reconfiguration device 140.

The internal item feature database 150 may be configured to receive, store, and/or transmit data. In various embodiments, the internal item feature database 150 may be associated with data associated with the item reconfiguration device 140, the external item feature database 170, and/or the user device 160. Additionally, or alternatively, in some embodiments the internal item feature database 150 stores user inputted data. The internal item feature database 150 may be located remotely from the user device 160, the external item feature database 170, and/or the item reconfiguration device 140, in proximity of the user device 160 and/or the item reconfiguration device 140, the external item feature database 170, and/or within the user device 160, the external item feature database 170, and/or the item reconfiguration device 140.

The network 130 may be embodied in any of a myriad of network configurations. In some embodiments, the network 130 may be a public network (e.g., the Internet). In some embodiments, the network 130 may be a private network (e.g., an internal localized, or closed-off network between particular devices). In some other embodiments, the network 130 may be a hybrid network (e.g., a network enabling internal communications between particular connected devices and external communications with other devices). In various embodiments, the network 130 may include one or more base station(s), relay(s), router(s), switch(es), cell tower(s), communications cable(s), routing station(s), and/ or the like. In various embodiments, components of the environment 100 may be communicatively coupled to transmit data to and/or receive data from one another over the network 130. Such configuration(s) include, without limitation, a wired or wireless Personal Area Network (PAN), Local Area Network (LAN), Metropolitan Area Network (MAN), Wide Area Network (WAN), and/or the like.

Additionally, while FIG. 1 illustrates certain components as separate, standalone entities communicating over the network 130, various embodiments are not limited to this configuration. In other embodiments, one or more components may be directly connected and/or share hardware or the like. For example, in some embodiments, the item reconfiguration device 140 may include internal item feature database 150.

FIG. 2 illustrates an exemplary block diagram of an example apparatus that may be specially configured in accordance with an example embodiment of the present disclosure. Specifically, FIG. 2 depicts an example computing apparatus 200 ("apparatus 200") specially configured in accordance with at least some example embodiments of the present disclosure. Examples of an apparatus 200 may include, but is not limited to, the internal item feature database 150, the item reconfiguration device 140, and/or the user device 160. The apparatus 200 includes processor 202, memory 204, input/output circuitry 206, communications circuitry 208, and/or optional artificial intelligence ("AI") and machine learning circuitry 210. In some embodiments, the apparatus 200 is configured to execute and perform the operations described herein.

Although components are described with respect to functional limitations, it should be understood that the particular implementations necessarily include the use of particular computing hardware. It should also be understood that in some embodiments certain of the components described herein include similar or common hardware. For example, in some embodiments two sets of circuitry both leverage use of the same processor(s), memory(ies), circuitry(ies), and/or the like to perform their associated functions such that duplicate hardware is not required for each set of circuitry.

In various embodiments, such as an computing apparatus 200 of the internal item feature database 150, the external item feature database 170, the item reconfiguration device 140, and/or the user device 160 may refer to, for example, one or more computers, computing entities, desktop computers, mobile phones, tablets, phablets, notebooks, laptops, distributed systems, servers, or the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein. In this regard, the apparatus 200 embodies a particular, specially configured computing entity transformed to enable the specific operations described herein and provide the specific advantages associated therewith, as described herein.

Processor 202 or processor circuitry 202 may be embodied in a number of different ways. In various embodiments, the use of the terms "processor" should be understood to include a single core processor, a multi-core processor, multiple processors internal to the apparatus 200, and/or one or more remote or "cloud" processor(s) external to the apparatus 200. In some example embodiments, processor 202 may include one or more processing devices configured to perform independently. Alternatively, or additionally, processor 202 may include one or more processor(s) configured in tandem via a bus to enable independent execution of operations, instructions, pipelining, and/or multithreading.

In an example embodiment, the processor 202 may be configured to execute instructions stored in the memory 204 or otherwise accessible to the processor. Alternatively, or additionally, the processor 202 may be configured to execute hard-coded functionality. As such, whether configured by hardware or software methods, or by a combination thereof, processor 202 may represent an entity (e.g., physically embodied in circuitry) capable of performing operations according to embodiments of the present disclosure while configured accordingly. Alternatively, or additionally, processor 202 may be embodied as an executor of software instructions, and the instructions may specifically configure the processor 202 to perform the various algorithms embodied in one or more operations described herein when such instructions are executed. In some embodiments, the processor 202 includes hardware, software, firmware, and/or a combination thereof that performs one or more operations described herein.

In some embodiments, the processor 202 (and/or co-processor or any other processing circuitry assisting or otherwise associated with the processor) is/are in communication with the memory 204 via a bus for passing information among components of the apparatus 200.

Memory 204 or memory circuitry 204 may be non-transitory and may include, for example, one or more volatile and/or non-volatile memories. In some embodiments, the memory 204 includes or embodies an electronic storage device (e.g., a computer readable storage medium). In some embodiments, the memory 204 is configured to store information, data, content, applications, instructions, or the like, for enabling an apparatus 200 to carry out various operations and/or functions in accordance with example embodiments of the present disclosure.

Input/output circuitry 206 may be included in the apparatus 200. In some embodiments, input/output circuitry 206 may provide output to the user and/or receive input from a user. The input/output circuitry 206 may be in communication with the processor 202 to provide such functionality. The input/output circuitry 206 may comprise one or more user interface(s). In some embodiments, a user interface may include a display that comprises the interface(s) rendered as a web user interface, an application user interface, a user device, a backend system, or the like. In some embodiments, the input/output circuitry 206 also includes a keyboard, a mouse, a joystick, a touch screen, touch areas, soft keys a microphone, a speaker, or other input/output mechanisms. The processor 202 and/or input/output circuitry 206 comprising the processor may be configured to control one or more operations and/or functions of one or more user interface elements through computer program instructions (e.g., software and/or firmware) stored on a memory accessible to the processor (e.g., memory 204, and/or the like). In some embodiments, the input/output circuitry 206 includes or utilizes a user-facing application to provide input/output functionality to a computing device and/or other display associated with a user.

Communications circuitry 208 may be included in the apparatus 200. The communications circuitry 208 may include any means such as a device or circuitry embodied in either hardware or a combination of hardware and software that is configured to receive and/or transmit data from/to a network and/or any other device, circuitry, or module in communication with the apparatus 200. In some embodiments the communications circuitry 208 includes, for example, a network interface for enabling communications with a wired or wireless communications network. Additionally, or alternatively, the communications circuitry 208 may include one or more network interface card(s), antenna(s), bus(es), switch(es), router(s), modem(s), and supporting hardware, firmware, and/or software, or any other device suitable for enabling communications via one or more communications network(s). In some embodiments, the communications circuitry 208 may include circuitry for interacting with an antenna(s) and/or other hardware or software to cause transmission of signals via the antenna(s) and/or to handle receipt of signals received via the antenna(s). In some embodiments, the communications circuitry 208 enables transmission to and/or receipt of data from a user device and/or other external computing device(s) in communication with the apparatus 200.

Data intake circuitry 212 may be included in the apparatus 200. The data intake circuitry 212 may include hardware, software, firmware, and/or a combination thereof, designed and/or configured to capture, receive, request, and/or otherwise gather data associated with operations of the internal item feature database 150, the item reconfiguration device 140, and/or the user device 160. In some embodiments, the data intake circuitry 212 includes hardware, software, firmware, and/or a combination thereof, that communicates with one or more components of the internal item feature database 150, the external item feature database 170, the item reconfiguration device 140, and/or the user device 160 to receive particular data associated with such operations of the internal item feature database 150, the external item feature database 170, the item reconfiguration device 140, and/or the user device 160. The data intake circuitry 212 may support such operations for the internal item feature database 150, the item reconfiguration device 140, and/or the user device 160. Additionally, or alternatively, in some embodiments, the data intake circuitry 212 includes hardware, software, firmware, and/or a combination thereof, that retrieves particular data associated with the internal item feature database 150, the item reconfiguration device 140, the external item feature database 170, and/or the user device 160.

AI and machine learning circuitry 210 may be included in the apparatus 200. The AI and machine learning circuitry 210 may include hardware, software, firmware, and/or a combination thereof designed and/or configured to request, receive, process, generate, and transmit data, data structures, control signals, and electronic information for training and executing a trained AI and machine learning model configured to facilitating the operations and/or functionalities described herein. For example, in some embodiments the AI and machine learning circuitry 210 includes hardware, software, firmware, and/or a combination thereof, that identifies training data and/or utilizes such training data for training a particular machine learning model, AI, and/or other model to generate particular output data based at least in part on learnings from the training data. Additionally, or alternatively, in some embodiments, the AI and machine learning circuitry 210 includes hardware, software, firmware, and/or a combination thereof, that embodies or retrieves a trained machine learning model, AI and/or other specially configured model utilized to process inputted data. Additionally, or alternatively, in some embodiments, the AI and machine learning circuitry 210 includes hardware, software, firmware, and/or a combination thereof that processes received data utilizing one or more algorithm(s), function(s), subroutine(s), and/or the like, in one or more pre-processing and/or subsequent operations that need not utilize a machine learning or AI model.

Data output circuitry 214 may be included in the apparatus 200. The data output circuitry 214 may include hardware, software, firmware, and/or a combination thereof, that configures and/or generates an output based at least in part on data processed by the apparatus 200. In some embodiments, the data output circuitry 214 includes hardware, software, firmware, and/or a combination thereof, that generates a particular report based at least in part on the processed data, for example where the report is generated based at least in part on a particular reporting protocol. Additionally, or alternatively, in some embodiments, the data output circuitry 214 includes hardware, software, firmware, and/or a combination thereof, that configures a particular output data object, output data file, and/or user interface for storing, transmitting, and/or displaying. For example, in some embodiments, the data output circuitry 214 generates and/or specially configures a particular data output for transmission to another system sub-system for further processing. Additionally, or alternatively, in some embodiments, the data output circuitry 214 includes hardware, software, firmware, and/or a combination thereof, that causes rendering of a specially configured user interface based at least in part on data received by and/or processing by the apparatus 200.

In some embodiments, two or more of the sets of circuitries 202-214 are combinable. Alternatively, or additionally, one or more of the sets of circuitry 202-214 perform some or all of the operations and/or functionality described herein as being associated with another circuitry. In some embodiments, two or more of the sets of circuitry 202-214 are combined into a single module embodied in hardware, software, firmware, and/or a combination thereof. For example, in some embodiments, one or more of the sets of circuitry, for example the AI and machine learning circuitry 210, may be combined with the processor 202, such that the processor 202 performs one or more of the operations described herein with respect the AI and machine learning circuitry 210.

With reference to FIGS. 1-4, in some embodiments, the item reconfiguration device 140 is configured to identify a plurality of items. In some embodiments, an item includes an electrical item, a mechanical item, an electromechanical item, a resin item, a fastener item, a battery item, a monitor item (e.g., a liquid crystal display (LCD) item, a light emitting diodes (LED) display item, etc.), a display item (e.g., LCD item, a LED monitor item, etc.), a switch item, a relay item, an O-ring item, a metal item, a plastic item, a motor item, an enclosure item, a chemical item, and/or the like. For example, an item may include a printed circuit board (PCB), a printed circuit board assembly (PCBA), a sensor, and/or the like. In some embodiments, an item may include one or more components that form a portion of the item. For example, an item may include an electrical component, a mechanical component, an electromechanical component, a resin component, a fastener component, a battery component, a monitor component (e.g., a liquid crystal display (LCD) component, a light emitting diodes (LED) display component, etc.), a display component (e.g., LCD component, a LED monitor component, etc.), a switch component, a relay component, an O-ring component, a metal component, a plastic component, a motor component, an enclosure component, a chemical component, and/or the like. In some embodiments, an item is associated with one or more field spaces. In some embodiments, a field space is a space, an area, a domain, and/or the like in which an item is used or implemented. For example, if an item includes a printed circuit board (PCB), an item may be associated with an electrical applications field space.

In some embodiments, the item reconfiguration device 140 is configured to receive item feature data. In some embodiments, item feature data includes one or more items of data representative and/or indicative of a plurality of item configuration features. In some embodiments, an item configuration feature is a data object that is representative and/or indicative of a feature, characteristic, component, specification, report, schematic, and/or the like associated with an item (e.g., an item of the plurality of items). In some embodiments, item feature data is associated with one or more of the plurality of items identified by the item reconfiguration device 140. In this regard, for example, the item reconfiguration device 140 may be configured to receive item feature data that includes a plurality of item configuration features associated with one or more items of the plurality of items identified by the item reconfiguration device 140. In some embodiments, a first part of item feature data is received from the internal item feature database 150. Additionally, or alternatively, a second part of item feature data is received from an external item feature database 170. In some embodiments, item feature data corresponds to and/or is item data.

In some embodiments, one or more of the plurality of item configuration features are associated with a feature type. In this regard, in some embodiments, the plurality of item configuration features includes one or more item configuration features associated with a general feature type. For example, the one or more item configuration features associated with a general feature type may be representative of an item life cycle (e.g., a life cycle of an item), an item team center (e.g., a team responsible for an item), an enterprise data warehouse (e.g., a data warehouse where information about an item is stored), a transfer volume report for an item, a quality report for an item, implementation issues (e.g., one or more issues associated with using an item for the item's intended purpose), a manufacturing report (e.g., a report indicating a item's quality, an item's yield), new item introduction information (e.g., information indicating requirements for introducing an item), a test report of an item, a component impact value requirement list (e.g., a list of costs associated with components of an item), a provider impact value requirement list (e.g., a provider of an item's cost requirement list), a new item introduction roadmap, a manufacturing sales inventory and operations planning (SIOP) report, financial report margins associated with an item, a preferred provider list (e.g., a list of preferred providers for components of an item), a personal responsibility level (e.g., a level of personal responsible for an item), a tariffs report (e.g., a tariffs report associated with an item), a logistics report (e.g., a report on the logistics of creating and/or distributing an item), an electronics manufacturing services list, an item schematic (e.g., a drawing, such as technical drawing, of an item), an item identification tag (e.g., a data tag that uniquely identifies an item), an item part number (e.g., a part number associated with an item), a raw material impact value (e.g., an impact value (such as a cost, utility, etc.) of a raw material on a per unit basis from which an item may be constructed), an item dimension (e.g., dimensions of an item), a material identification tag (e.g., a data tag that uniquely identifies a particular material that is used in an item), a sub commodity owner (e.g., an SCO associated with an item) and/or the like.

In some embodiments, the plurality of item configuration features includes one or more configuration features associated with a manufacturing feature type. For example, the one or more item configuration features associated with a manufacturing feature type may be representative of an impact value of manufactured items sold in a time period by stock keeping unit, receiver returns by manufacturing location of an item, fastener type used in an item, switches and relays used in an item, batteries used in an item, yield per stock keeping unit of an item, metal (e.g., sheet metal) used in an item, and/or the like.

In some embodiments, the plurality of item configuration features includes one or more configuration features associated with an engineering feature type. For example, the one or more item configuration features associated with an engineering feature type may be representative of an item requirement specification (e.g., a specification indicating one or more components of an item that are required for the item to function correctly), a type of printed circuit board assembly used in an item (e.g., ECAD, Gerber), a printed circuit board assembly bill of manufacturing, a bill of materials, a 3-dimensional model of an item, a 2-dimensional model of an item, a 3-dimensional model of a component of an item, a 2-dimensional model of a component of an item, a dimension of an item, a datasheet associated with an item, a yield strength of an item, a density of an item, a weight of an item, and/or the like.

In some embodiments, the plurality of item configuration features includes one or more configuration features associated with a logistics feature type. For example, the one or more item configuration features associated with a logistics feature type may be representative of a tariff impact value associated with an item, list of air shipments per stock keeping unit for an item, list of shipments in which an item is transferred in a non-full container, and/or the like.

In some embodiments, the plurality of item configuration features includes one or more configuration features associated with a planning feature type. For example, the one or more item configuration features associated with a planning feature type may be representative of a list of excess inventory of an item over a particular time period, an updated SIOP of components of an item, and/or the like. In some embodiments, the plurality of item configuration features includes one or more configuration features associated with a new item feature type. For example, the one or more item configuration features associated with a new item feature type may be representative of a PG5 impact value improvement plan, a PG3 impact value baseline, and/or the like.

In some embodiments, the plurality of item configuration features includes one or more configuration features associated with a sourcing feature type. For example, the one or more item configuration features associated with a sourcing feature type may be representative of specifications of high impact value components of an item, high volume components for an item, impact value increases in a time period associated with an item, impact value by component of an item, percent of value engineering per item in a time period, percent of component engineering per component in a time period, OEL associated all items of a particular type (e.g., all electrical items), OEL associated all components of an item (e.g., all components of an electrical item), and/or the like.

In some embodiments, the item reconfiguration device 140 is configured to determine one or more field item predictions. In some embodiments, a field item prediction is a data object that is representative and/or indicative of an item configuration feature that is not represented in the item feature data and is determined by the item reconfiguration device 140. Said differently, for example, by determining one or more field item predictions, the item reconfiguration device 140 may be configured to use item feature data that represents at least some of the item configuration features associated with an item to determine and/or predict other item configuration features associated with a particular item.

In some embodiments, the item reconfiguration device 140 is configured to determine one or more field item predictions by applying item feature data to the item data hub machine learning component 306. In some embodiments, for example, determining one or more field item predictions includes identifying a first item configuration feature of the plurality of item configuration features (e.g., the plurality of item configuration features represented by the item feature data received by the item reconfiguration device 140). For example, determining one or more field item predictions includes identifying a first item configuration feature that is representative of an item schematic. In some embodiments, determining one or more field item predictions includes determining a first field item prediction by applying the first item configuration feature to the item data hub machine learning component 306 of the composite machine learning model 300. For example, the first field item prediction may be representative of an item weight (e.g., the weight of an item in the plurality of items). In this regard, for example, the item data hub machine learning component 306 of the composite machine learning model 300 is configured to determine an item weight associated with an item of the plurality of items from an item schematic associated with an item of the plurality of items. For example, the item data hub machine learning component 306 of the composite machine learning model 300 may be configured to determine an item weight associated with an item from an item schematic when item feature data received by the item reconfiguration device 140 includes an item configuration feature representative of an item schematic but does not include an item configuration feature representative of an item weight.

In some embodiments, for example, determining one or more field item predictions includes identifying a second item configuration feature of the plurality of item configuration features. For example, the second item configuration feature may be a material identification tag. In some embodiments, determining one or more field item predictions includes identifying a third item configuration feature of the plurality of item configuration features. For example, the third item configuration feature may be representative of a raw material impact value. In some embodiments, the third item configuration feature may be identified using the second item configuration feature. In this regard, for example, a material identification tag may be used to determine a raw material impact value associated with a particular material. In some embodiments, determining one or more field item predictions includes determining a second field item prediction by applying the first field item prediction and the third item configuration feature to the item data hub machine learning component 306 of the composite machine learning model 300. For example, the second field item prediction may be representative of an item material impact value (e.g., a cost or utility associated with the material in an item of the plurality of items). In this regard, in some embodiments, the item data hub machine learning component 306 of the composite machine learning model 300 is configured to determine an item material impact value associated with an item of the plurality of items, from an item weight and a raw material impact value. For example, the item data hub machine learning component 306 of the composite machine learning model 300 may be configured to determine an item weight associated with an item from an item schematic when item feature data received by the item reconfiguration device 140 includes an item configuration feature representative of an item schematic, which can be used to determine an item weight, but does not include an item configuration feature representative of an item material impact value.

In some embodiments, the item data hub machine learning component 306 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to determine one or more field item predictions. In this regard, in some embodiments, the item data hub machine learning component 306 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, and/or generative artificial intelligence techniques. In this regard, in some embodiments, the item data hub machine learning component 306 of the composite machine learning model 300 is configured to determine and/or predict one or more field item predictions that that are not possible to determine and/or predict using existing databases, existing computing devices, and/or associated data transformation techniques. For example, the item data hub machine learning component 306 of the composite machine learning model 300 may be configured to determine and/or predict one or more field item predictions that are not possible using inner joins, outer joins, right joins, and/or left joins in an existing SQL database.

In some embodiments, the item reconfiguration device 140 is configured to generate a field item feature structure. In some embodiments, the field item feature structure is associated with the plurality of items associated with the item feature data. In some embodiments, a field item feature structure is a data structure that includes an aggregation of item feature data and field item predictions. In some embodiments, the aggregation of item feature data and field item predictions in a field item feature structure may be organized in an at least partially ordered structure. In some embodiments, the item reconfiguration device 140 is configured to generate a field item feature structure in response to receiving item feature data and/or determining one or more field item predictions. Additionally, or alternatively, the item reconfiguration device 140 is configured to generate a field item feature structure in response to a request to determine one or more available field spaces. Additionally, or alternatively, the item reconfiguration device 140 is configured to generate a field item feature structure in response to a request to generate item candidate reconfiguration data and/or item reconfiguration data. In some embodiments, the item reconfiguration device 140 is configured to generate a field item feature structure using the item data hub machine learning component 306 of the composite machine learning model 300.

In some embodiments, the item reconfiguration device 140 is configured to determine one or more available field spaces. In this regard, in some embodiments, the item reconfiguration device 140 is configured to determine one or more available field spaces using a field item feature structure, such as a field item feature structure associated with the plurality of items. In some embodiments, an available field space is a space, an area, a domain, and/or the like in which an item in the plurality of items identified by the item reconfiguration device 140 is not used and/or implemented in. Said differently, an available field space may be a space, an area, a domain, and/or the like that is different than the one or more field spaces that are associated with an item in the plurality of items when it is identified by the item reconfiguration device 140. In some embodiments, the item reconfiguration device 140 is configured to determine one or more available field spaces by performing one or more mining techniques on a field item feature structure. In some embodiments, the item reconfiguration device 140 is configured to perform the one or more mining techniques using the item data hub machine learning component 306 of the composite machine learning model 300.

In some embodiments, the item reconfiguration device 140 is configured to identify an item of a plurality of items. For example, the item reconfiguration device 140 may be configured to identify an item of a plurality of items identified by the item reconfiguration device 140. In some embodiments, the item reconfiguration device 140 is configured to identify an item that is a candidate for reconfiguration by the item reconfiguration device 140 (e.g., an item from a plurality of items). For example, the item reconfiguration device 140 may be configured to identify an item that is a candidate for reconfiguration from a plurality of items when the item is able to be reconfigured to increase the functionality of the item. As another example, the item reconfiguration device 140 may be configured to identify an item that is a candidate for reconfiguration from a plurality of items when the item is able to be reconfigured to reduce the impact value (e.g., cost) of the item. As another example, the item reconfiguration device 140 may be configured to identify an item that is a candidate for reconfiguration from a plurality of items when the item is able to be reconfigured to simplify the manufacturing process of the item. As another example, the item reconfiguration device 140 may be configured to identify an item that is a candidate for reconfiguration from a plurality of items when the item is able to be reconfigured to optimize procurement of components of the item. As another example, the item reconfiguration device 140 may be configured to identify an item that is a candidate for reconfiguration from a plurality of items when the item is able to be reconfigured to enable the item to be associated with an available field space (e.g., the item can be reconfigured such that the item can be implemented and/or used in a space, an area, a domain, and/or the like in which the item is not currently being implemented and/or used). Said differently, for example, the item reconfiguration device 140 may be configured to identify an item from a plurality of items that the item reconfiguration device 140 is able to reconfigure to improve the item.

In some embodiments, the item reconfiguration device 140 is configured to identify an item that is a candidate for reconfiguration from a plurality of items using a field item feature structure and/or an item reconfiguration candidate machine learning component 308 of the composite machine learning model 300. In some embodiments, the item reconfiguration device 140 is configured to use the item reconfiguration candidate machine learning component 308 to process a field item feature structure to identify an item that is a candidate for reconfiguration. In this regard, in some embodiments, the item reconfiguration device 140 is configured to use the item reconfiguration candidate machine learning component 308 to process a field item feature structure to identify one or more item configuration features associated with an item that indicate that an item is a candidate for reconfiguration.

In this regard, for example, the item reconfiguration device 140 may be configured to process a field item feature structure to identify an item for reconfiguration based on item configuration features associated with the item indicating that a particular material of an item should be reconfigured (e.g., a plastic item made of resins and/or an item made of sheet metal). As another example, the item reconfiguration device 140 may be configured to process a field item feature structure to identify an item for reconfiguration based on item configuration features associated with the item indicating an item that should be reconfigured by standardizing the components of the item (e.g., by standardizing components of an item such as fasteners, batteries, displays (LCD), motors, switches, and relays). As another example, the item reconfiguration device 140 may be configured to process a field item feature structure to identify an item for reconfiguration based on item feature configurations associated with the item indicating that dimensions of an item should be reconfigured (e.g., dimensions of sheet metal used in a cabinet item). As another example, the item reconfiguration device 140 may be configured to process a field item feature structure to identify an item for reconfiguration based on item configuration features associated with the item indicating that an item should be reconfigured by adjusting a formation procedure associated creating the item (e.g., adjusting manufacturing operations used to create the item). As another example, the item reconfiguration device 140 may be configured to process a field item feature structure to identify an item for reconfiguration based on item configuration features associated with the item indicating that an item should be reconfigured by removing a static component of an item.

In some embodiments, the item reconfiguration candidate machine learning component 308 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to identify an item that is a candidate for reconfiguration from a plurality of items. In this regard, in some embodiments, the item reconfiguration candidate machine learning component 308 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, and/or generative artificial intelligence techniques. For example, the item reconfiguration candidate machine learning component 308 may be configured to use any of the above techniques identify an item that is a candidate for reconfiguration from a plurality of items.

In some embodiments, the item reconfiguration device 140 is configured to generate item reconfiguration data. In some embodiments, item reconfiguration data includes one or more items of data representative and/or indicative of one or more predicted reconfigurations of an item, such as an item that the item reconfiguration device 140 has identified as a candidate for reconfiguration from a plurality of items.

In some embodiments, one or more predicted reconfigurations of an item include reconfiguring an item by replacing a first component of the item with a second component. In some embodiments, when one or more predicted reconfigurations of an item that include reconfiguring an item by replacing a first component of the item with a second component, the first component and/or the second component may be a resin component of the item. In this regard, for example, the one or more predicted reconfigurations of an item may include replacing a first resin component with a second resin component that has similar functionality and/or a lower impact value (e.g., a lower cost that the first resin component). In some embodiments, one or more predicted reconfigurations of an item that include reconfiguring an item by replacing a first resin component of the item with a second resin component are associated with a first portion of item reconfiguration data.

Additionally, or alternatively, when one or more predicted reconfigurations of an item include reconfiguring an item by replacing a first component of the item with a second component, the first component and/or the second component may be a metal component of the item. In this regard, for example, the first metal component may be an unstandardized metal component and the second metal component may be a standardized metal component. In some embodiments, the second metal component may have been selected based on one or more item configuration features that include a yield strength of an item, a density of an item, a weight of an item, and/or the like. In some embodiments, one or more predicted reconfigurations of an item that include reconfiguring an item by replacing a first metal component of the item with a second metal component are associated with a first portion of item reconfiguration data.

In some embodiments, one or more predicted reconfigurations of an item include reconfiguring an item by standardizing one or more components of the item. In this regard, for example, standardizing one or more components of an item may include replacing non-standard components with standard components. In some embodiments, a standard component is a component that is commonly used in the plurality of items identified by the item reconfiguration device 140 while a non-standard component is a component that is not commonly used in the plurality of items identified by the item reconfiguration device 140. For example, standardizing one or more components of an item may include replacing a non-standard electrical component, a non-standard mechanical component, a non-standard electromechanical component, a non-standard resin component, a non-standard fastener component, a non-standard battery component, a non-standard monitor component (e.g., a liquid crystal display (LCD) component, a light emitting diodes (LED) display component, etc.), a non-standard display component (e.g., LCD component, a LED monitor component, etc.), a non-standard switch component, a non-standard relay component, a non-standard O-ring component, a non-standard metal component, a non-standard plastic component, a non-standard motor component, a non-standard enclosure component, a non-standard component, and/or the like with an equivalent standard component. In some embodiments, one or more predicted reconfigurations of an item that include reconfiguring an item by standardizing one or more components of the item are associated with a third portion of item reconfiguration data.

In some embodiments, one or more predicted reconfigurations of an item include reconfiguring an item by standardizing one or more dimensions of the item. In this regard, for example, standardizing one or more dimensions of an item may include reconfiguring one or more dimensions of an item to one or more standardized dimensions. For example, reconfiguring one or more dimensions of an item to a standardized dimension used by items similar to the item. In some embodiments, one or more predicted reconfigurations of an item that include reconfiguring an item by standardizing one or more dimensions of the item are associated with a fourth portion of item reconfiguration data.

In some embodiments, one or more predicted reconfigurations of an item include reconfiguring an item by altering one or more manufacturing operations associated with the item, such as one or more manufacturing operations used to create an item. In this regard, in some embodiments, altering one or more manufacturing operations associated with an item may include removing manufacturing operations, simplifying manufacturing operations, combining manufacturing operations, replacing manufacturing operations, adding manufacturing operations, and/or the like. For example, altering one or more manufacturing operations includes replacing a stamped metal manufacturing operation with a plastic formation manufacturing operation. In some embodiments, one or more predicted reconfigurations of an item that include reconfiguring an item by altering one or more manufacturing operations associated with the item are associated with a fifth portion of item reconfiguration data.

In some embodiments, one or more predicted reconfigurations of an item include reconfiguring an item by removing a static component of the item. In some embodiments, a static component is a component of an item that is non-moving. For example, a static component may provide limited functionality to an item. In this regard, in some embodiments, by removing a static component of an item, the complexity and impact value of an item may be reduced. In some embodiments, one or more predicted reconfigurations of an item that include reconfiguring an item by removing a static component of the item are associated with a sixth portion of item reconfiguration data.

In some embodiments, the item reconfiguration device 140 is configured to generate item reconfiguration data using a field item feature structure and at least one of a plurality of reconfiguration machine learning components 304 of the composite machine learning model 300. In some embodiments, the plurality of reconfiguration machine learning components 304 includes a first item material reconfiguration machine learning component 310. In this regard, in some embodiments, the first item material reconfiguration machine learning component 310 is configured to process a field item feature structure to generate at least the first portion of item reconfiguration data. In some embodiments, the first portion of item reconfiguration data includes one or more items of data representative and/or indicative of one or more predicted reconfigurations of an item that include reconfiguring an item by replacing a first resin component of the item with a second resin component. In this regard, for example, the first item material reconfiguration machine learning component 310 is configured to determine one or more predicted reconfigurations of an item that include reconfiguring an item by replacing a first resin component of the item with a second resin component.

In some embodiments, the first item material reconfiguration machine learning component 310 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the first portion of item reconfiguration data. In this regard, in some embodiments, the first item material reconfiguration machine learning component 310 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the first item material reconfiguration machine learning component 310 may be configured to process a field item feature structure to identify a first resin component of an item using an optical character recognition technique to identify the first resign component from an item configuration feature associated with the field item feature structure that is indicative of an item schematic.

In some embodiments, the plurality of reconfiguration machine learning components 304 includes a second item material reconfiguration machine learning component 312. In some embodiments, the second item material reconfiguration machine learning component 312 is configured to process a field item feature structure to generate at least the second portion of item reconfiguration data. In some embodiments, the second portion of item reconfiguration data includes one or more items of data representative and/or indicative of one or more predicted reconfigurations of an item that include reconfiguring an item by replacing a first metal component of the item with a second metal component. In this regard, for example, the second item material reconfiguration machine learning component 312 is configured to determine one or more predicted reconfigurations of an item that include reconfiguring an item by replacing a first metal component of the item with a second metal component.

In some embodiments, the second item material reconfiguration machine learning component 312 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the second portion of item reconfiguration data. In this regard, in some embodiments, the second item material reconfiguration machine learning component 312 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the second item material reconfiguration machine learning component 312 may be configured to process a field item feature structure to identify a second metal component of an item using a clustering technique associated with one or more item configuration features associated with the field item feature structure, such as item configuration features that include a yield strength of an item, a density of an item, a weight of an item, and/or the like.

In some embodiments, the plurality of reconfiguration machine learning components 304 includes an item component standardization machine learning component 314. In some embodiments, the item component standardization machine learning component 314 is configured to process a field item feature structure to generate at least the third portion of item reconfiguration data. In some embodiments, the third portion of item reconfiguration data includes one or more items of data representative and/or indicative of one or more predicted reconfigurations of an item that include reconfiguring an item by standardizing one or more components of the item. In this regard, for example, the item component standardization machine learning component 314 is configured to determine one or more predicted reconfigurations of an item that include reconfiguring an item by standardizing one or more components of the item.

In some embodiments, the item component standardization machine learning component 314 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the third portion of item reconfiguration data. In this regard, in some embodiments, the item component standardization machine learning component 314 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the item component standardization machine learning component 314 may be configured to process a field item feature structure to identify standard components (e.g., a standard fastener component) corresponding to non-standard components of an item using a clustering technique.

In some embodiments, the plurality of reconfiguration machine learning components 304 includes an item matching machine learning component 316. In some embodiments, the item matching machine learning component 316 is configured to process a field item feature structure to generate at least the fourth portion of item reconfiguration data. In some embodiments, the fourth portion of item reconfiguration data includes one or more items of data representative and/or indicative of one or more predicted reconfigurations of an item that include reconfiguring an item by standardizing one or more dimensions of an item. In this regard, for example, the item matching machine learning component 316 is configured to determine one or more predicted reconfigurations of an item that include reconfiguring an item by standardizing one or more dimensions of an item.

In some embodiments, the item matching machine learning component 316 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the fourth portion of item reconfiguration data. In this regard, in some embodiments, the item matching machine learning component 316 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the item matching machine learning component 316 may be configured to process a field item feature structure to identify one or more standard dimensions of an item using a clustering technique associated with one or more item configuration features associated with the field item feature structure.

In some embodiments, the plurality of reconfiguration machine learning components 304 includes an item formation machine learning component 318. In some embodiments, the item formation machine learning component 318 is configured to process a field item feature structure to generate at least the fifth portion of item reconfiguration data. In some embodiments, the fifth portion of item reconfiguration data includes one or more items of data representative and/or indicative of one or more predicted reconfigurations of an item that include reconfiguring an item by altering one or more manufacturing operations associated with the item. In this regard, for example, the item formation machine learning component 318 is configured to determine one or more predicted reconfigurations of an item that include reconfiguring an item by altering one or more manufacturing operations associated with the item.

In some embodiments, the item formation machine learning component 318 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the fifth portion of item reconfiguration data. In this regard, in some embodiments, the item formation machine learning component 318 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the item formation machine learning component 318 may be configured to process a field item feature structure to identify whether an item was generated using a punching manufacturing operation, a pressing manufacturing operation, and/or a forming manufacturing operation by using an optical character recognition technique associated with an item configuration feature indicative of an item schematic.

In some embodiments, includes a static item component machine learning component 320. In some embodiments, the static item component machine learning component 320 is configured to process a field item feature structure to generate at least the sixth portion of item reconfiguration data. In some embodiments, the sixth portion of item reconfiguration data includes one or more items of data representative and/or indicative of one or more predicted reconfigurations of an item that include reconfiguring an item by removing a static component of an item. In this regard, for example, the static item component machine learning component 320 is configured to determine one or more predicted reconfigurations of an item that include reconfiguring an item by removing a static component of an item.

In some embodiments, the static item component machine learning component 320 of the composite machine learning model 300 may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the sixth portion of item reconfiguration data. In this regard, in some embodiments, the static item component machine learning component 320 of the composite machine learning model 300 may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the static item component machine learning component 320 may be configured to process a field item feature structure to identify static component of an item using one of the above techniques.

In some embodiments, the item data hub machine learning component 306, the item reconfiguration candidate machine learning component 308, and the plurality of reconfiguration machine learning components 304 are all components of the composite machine learning model 300. In this regard, in some embodiments, the item data hub machine learning component 306, the item reconfiguration candidate machine learning component 308, and the plurality of reconfiguration machine learning components 304 are configured to communicate with each other, one or more other components of the item reconfiguration device 140, and/or one or more devices external to the item reconfiguration device 140 via a bus 302.

In some embodiments, the item reconfiguration device 140 is configured to initiate performance of one or more item reconfiguration actions. In some embodiments, the item reconfiguration device 140 is configured to initiate performance of one or more item reconfiguration actions based on item reconfiguration data, item feature data, a field item feature structure, and/or the like. In this regard, in some embodiments, initiating performance of one or more item related actions includes the item reconfiguration device 140 being configured to generate an item reconfiguration interface component 402. In some embodiments, the item reconfiguration interface component 402 includes an item feature interface element 404 configured to display item feature data. In some embodiments, the item reconfiguration interface component 402 includes an item reconfiguration interface element 406 configured to display item reconfiguration data. In some embodiments, the item reconfiguration interface component 402 includes an item visualization interface element 408 configured to display a visual representation of an item that is a candidate for reconfiguration. For example, the item visualization interface element 408 may be configured to display a visual representation of an item as the item currently is and/or what the item would appear like after the item has been reconfigured in accordance with item reconfiguration data generated by the item reconfiguration device 140.

In some embodiments, initiating performance of item related actions includes the item reconfiguration device 140 being configured to cause the item reconfiguration interface component 402 to be rendered to an item reconfiguration interface 400. In some embodiments, the item reconfiguration interface 400 may be provided on item reconfiguration device 140. Additionally, or alternatively, the item reconfiguration interface 400 may be provided on the user device 160. Additionally, or alternatively, the item reconfiguration interface 400 may be provided on one or more other devices, such as a remote device.

In some embodiments, initiating performance of one or more item reconfiguration actions includes the item reconfiguration device 140 being configured to cause an item inventory record to be modified. In some embodiments, an item inventory record is a record that indicates all of the components that are included in an item. In this regard, for example, an item inventory record may be modified to remove a component from an item inventory record when item reconfiguration data includes one or more items of data representative and/or indicative of one or more predicted reconfigurations of an item that includes reconfiguring an item by replacing a first component of the item with a second component (e.g., removing the first component). In some embodiments, a second component may replace a first component when the first component of the item is becoming obsolete. In this regard, in some embodiments, the item reconfiguration device 140 is configured to determine if the first component and/or the second component is obsolete. As another example, for example, an item inventory record may be modified to add a component to an item inventory record when item reconfiguration data includes one or more items of data representative and/or indicative of one or more predicted reconfigurations of an item that includes reconfiguring an item by replacing a first component of the item with a second component (e.g., adding the first component). As another example, an item inventory record may be modified to remove a component from an item inventory record when item reconfiguration data includes one or more items of data representative and/or indicative of one or more predicted reconfigurations of an item that includes reconfiguring an item by replacing non-standard components with standard components (e.g., remove the non-standard components). As another example, an item inventory record may be modified to add a component to an item inventory record when item reconfiguration data includes one or more items of data representative and/or indicative of one or more predicted reconfigurations of an item that includes reconfiguring an item by replacing non-standard components with standard components (e.g., add the standard components). In some embodiments, modifying an item inventory record to remove a component may cause a transmission to be sent to a supplier to cancel an order for a removed component. Additionally, or alternatively, modifying an item inventory record to add a component may cause a transmission to be sent to a supplier to place an order for an added component. As another example, an item inventory record may be modified to remove a component from an item inventory record when item reconfiguration data includes one or more items of data representative and/or indicative of the component being obsolete. In this way, for example, the obsolete component may no longer be considered as a possible component to be included in an item.

In some embodiments, initiating performance of one or more item reconfiguration actions includes the item reconfiguration device 140 being configured to cause an item manufacturing procedure to be modified. In some embodiments, an item manufacturing procedure is a series of steps that are performed to generate and/or create an item. For example, an item manufacturing procedure may be a series of one or more manufacturing operations that are performed to generate and/or create an item. In this regard, in some embodiments, causing an item manufacturing procedure to be modified includes modifying an item manufacturing procedure by removing manufacturing operations, simplifying manufacturing operations, combining manufacturing operations, replacing manufacturing operations, adding manufacturing operations, and/or the like. For example, an item manufacturing procedure may be modified by altering one or more manufacturing operations in the item manufacturing procedure by replacing a stamped metal manufacturing operation with a plastic formation manufacturing operation.

Example Methods

Referring now to FIG. 5, a flowchart providing an example method 500 is illustrated. In this regard, FIG. 5 illustrates operations that may be performed by the internal item feature database 150, the external item feature database 170, the item reconfiguration device 140, the user device 160, and/or the like. In some embodiments, the method 500 includes operations for generating item reconfiguration data and/or initiating performance of one or more item reconfiguration actions. In some embodiments, the example method 500 defines a process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 500.

As shown in block 502, the method 500 may include receiving item feature data representative of a plurality of item configuration features associated with a plurality of items. As described above, in some embodiments, item feature data includes one or more items of data representative and/or indicative of a plurality of item configuration features. In some embodiments, an item configuration feature is a data object that is representative and/or indicative of a feature, characteristic, component, specification, report, schematic, and/or the like associated with an item (e.g., an item of the plurality of items). In some embodiments, item feature data is associated with one or more of the plurality of items identified by the item reconfiguration device. In this regard, for example, the item reconfiguration device may be configured to receive item feature data that includes a plurality of item configuration features associated with one or more items of the plurality of items identified by the item reconfiguration device. In some embodiments, a first part of item feature data is received from the internal item feature database. Additionally, or alternatively, a second part of item feature data is received from an external item feature database. In some embodiments, item feature data corresponds to and/or is item data. In some embodiments, one or more of the plurality of item configuration features are associated with a feature type.

As shown in block 504, the method 500 may include generating a field item feature structure. As described above, in some embodiments, the field item feature structure is associated with the plurality of items associated with the item feature data. In some embodiments, a field item feature structure is a data structure that includes an aggregation of item feature data and field item predictions. In some embodiments, the aggregation of item feature data and field item predictions in a field item feature structure may be organized in an at least partially ordered structure. In some embodiments, the item reconfiguration device is configured to generate a field item feature structure in response to receiving item feature data and/or determining one or more field item predictions. Additionally, or alternatively, the item reconfiguration device is configured to generate a field item feature structure in response to a request to determine one or more available field spaces. Additionally, or alternatively, the item reconfiguration device is configured to generate a field item feature structure in response to a request to generate item candidate reconfiguration data and/or item reconfiguration data. In some embodiments, the item reconfiguration device is configured to generate a field item feature structure using the item data hub machine learning component of the composite machine learning model.

As shown in block 506, the method 500 may include identifying an item of the plurality of items using the field item feature structure and an item reconfiguration candidate machine learning component of a composite machine learning model. As described above, in some embodiments, the item reconfiguration device may be configured to identify an item of a plurality of items identified by the item reconfiguration device. In some embodiments, the item reconfiguration device is configured to identify an item that is a candidate for reconfiguration by the item reconfiguration device (e.g., an item from a plurality of items). For example, the item reconfiguration device may be configured to identify an item that is a candidate for reconfiguration from a plurality of items when the item is able to be reconfigured to increase the functionality of the item. As another example, the item reconfiguration device may be configured to identify an item that is a candidate for reconfiguration from a plurality of items when the item is able to be reconfigured to reduce the impact value (e.g., cost) of the item. As another example, the item reconfiguration device may be configured to identify an item that is a candidate for reconfiguration from a plurality of items when the item is able to be reconfigured to simplify the manufacturing process of the item. As another example, the item reconfiguration device may be configured to identify an item that is a candidate for reconfiguration from a plurality of items when the item is able to be reconfigured to optimize procurement of components of the item. As another example, the item reconfiguration device may be configured to identify an item that is a candidate for reconfiguration from a plurality of items when the item is able to be reconfigured to enable the item to be associated with an available field space (e.g., the item can be reconfigured such that the item can be implemented and/or used in a space, an area, a domain, and/or the like in which the item is not currently being implemented and/or used). Said differently, for example, the item reconfiguration device may be configured to identify an item from a plurality of items that the item reconfiguration device is able to reconfigure to improve the item.

In some embodiments, the item reconfiguration device is configured to identify an item that is a candidate for reconfiguration from a plurality of items using a field item feature structure and/or an item reconfiguration candidate machine learning component of the composite machine learning model. In some embodiments, the item reconfiguration device is configured to use the item reconfiguration candidate machine learning component to process a field item feature structure to identify an item that is a candidate for reconfiguration. In this regard, in some embodiments, the item reconfiguration device is configured to use the item reconfiguration candidate machine learning component to process a field item feature structure to identify one or more item configuration features associated with an item that indicate that an item is a candidate for reconfiguration.

In this regard, for example, the item reconfiguration device may be configured to process a field item feature structure to identify an item for reconfiguration based on item configuration features associated with the item indicating that a particular material of an item should be reconfigured (e.g., a plastic item made of resins and/or an item made of sheet metal). As another example, the item reconfiguration device may be configured to process a field item feature structure to identify an item for reconfiguration based on item configuration features associated with the item indicating an item that should be reconfigured by standardizing the components of the item (e.g., by standardizing components of an item such as fasteners, batteries, displays (LCD), motors, switches, and relays). As another example, the item reconfiguration device may be configured to process a field item feature structure to identify an item for reconfiguration based on item feature configurations associated with the item indicating that dimensions of an item should be reconfigured (e.g., dimensions of sheet metal used in a cabinet item). As another example, the item reconfiguration device may be configured to process a field item feature structure to identify an item for reconfiguration based on item configuration features associated with the item indicating that an item should be reconfigured by adjusting a formation procedure associated creating the item (e.g., adjusting manufacturing operations used to create the item). As another example, the item reconfiguration device may be configured to process a field item feature structure to identify an item for reconfiguration based on item configuration features associated with the item indicating that an item should be reconfigured by removing a static component of an item.

In some embodiments, the item reconfiguration candidate machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to identify an item that is a candidate for reconfiguration from a plurality of items. In this regard, in some embodiments, the item reconfiguration candidate machine learning component of the composite machine learning model may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, and/or generative artificial intelligence techniques. For example, the item reconfiguration candidate machine learning component may be configured to use any of the above techniques identify an item that is a candidate for reconfiguration from a plurality of items.

As shown in block 508, the method 500 may include generating item reconfiguration data for the item of the plurality of items using the field item feature structure and at least one of a plurality of reconfiguration machine learning components of the composite machine learning model. As described above, in some embodiments, item reconfiguration data includes one or more items of data representative and/or indicative of one or more predicted reconfigurations of an item, such as an item that the item reconfiguration device has identified as a candidate for reconfiguration from a plurality of items.

In some embodiments, one or more predicted reconfigurations of an item include reconfiguring an item by replacing a first component of the item with a second component. In some embodiments, when one or more predicted reconfigurations of an item that include reconfiguring an item by replacing a first component of the item with a second component, the first component and/or the second component may be a resin component of the item. In this regard, for example, the one or more predicted reconfigurations of an item may include replacing a first resin component with a second resin component that has similar functionality and/or a lower impact value (e.g., a lower cost that the first resin component). In some embodiments, one or more predicted reconfigurations of an item that include reconfiguring an item by replacing a first resin component of the item with a second resin component are associated with a first portion of item reconfiguration data.

Additionally, or alternatively, when one or more predicted reconfigurations of an item include reconfiguring an item by replacing a first component of the item with a second component, the first component and/or the second component may be a metal component of the item. In this regard, for example, the first metal component may be an unstandardized metal component and the second metal component may be a standardized metal component. In some embodiments, the second metal component may have been selected based on one or more item configuration features that include a yield strength of an item, a density of an item, a weight of an item, and/or the like. In some embodiments, one or more predicted reconfigurations of an item that include reconfiguring an item by replacing a first metal component of the item with a second metal component are associated with a first portion of item reconfiguration data.

In some embodiments, one or more predicted reconfigurations of an item include reconfiguring an item by standardizing one or more components of the item. In this regard, for example, standardizing one or more components of an item may include replacing non-standard components with standard components. In some embodiments, a standard component is a component that is commonly used in the plurality of items identified by the item reconfiguration device while a non-standard component is a component that is not commonly used in the plurality of items identified by the item reconfiguration device. For example, standardizing one or more components of an item may include replacing a non-standard electrical component, a non-standard mechanical component, a non-standard electromechanical component, a non-standard resin component, a non-standard fastener component, a non-standard battery component, a non-standard monitor component (e.g., a liquid crystal display (LCD) component, a light emitting diodes (LED) display component, etc.), a non-standard display component (e.g., LCD component, a LED monitor component, etc.), a non-standard switch component, a non-standard relay component, a non-standard O-ring component, a non-standard metal component, a non-standard plastic component, a non-standard motor component, a non-standard enclosure component, a non-standard chemical component, and/or the like with an equivalent standard component. In some embodiments, one or more predicted reconfigurations of an item that include reconfiguring an item by standardizing one or more components of the item are associated with a third portion of item reconfiguration data.

In some embodiments, one or more predicted reconfigurations of an item include reconfiguring an item by standardizing one or more dimensions of the item. In this regard, for example, standardizing one or more dimensions of an item may include reconfiguring one or more dimensions of an item to one or more standardized dimensions. For example, reconfiguring one or more dimensions of an item to a standardized dimension used by items similar to the item. In some embodiments, one or more predicted reconfigurations of an item that include reconfiguring an item by standardizing one or more dimensions of the item are associated with a fourth portion of item reconfiguration data.

In some embodiments, one or more predicted reconfigurations of an item include reconfiguring an item by altering one or more manufacturing operations associated with the item, such as one or more manufacturing operations used to create an item. In this regard, in some embodiments, altering one or more manufacturing operations associated with an item may include removing manufacturing operations, simplifying manufacturing operations, combining manufacturing operations, replacing manufacturing operations, adding manufacturing operations, and/or the like. For example, altering one or more manufacturing operations includes replacing a stamped metal manufacturing operation with a plastic formation manufacturing operation. In some embodiments, one or more predicted reconfigurations of an item that include reconfiguring an item by altering one or more manufacturing operations associated with the item are associated with a fifth portion of item reconfiguration data.

In some embodiments, one or more predicted reconfigurations of an item include reconfiguring an item by removing a static component of the item. In some embodiments, a static component is a component of an item that is non-moving. For example, a static component may provide limited functionality to an item. In this regard, in some embodiments, by removing a static component of an item, the complexity and impact value of an item may be reduced. In some embodiments, one or more predicted reconfigurations of an item that include reconfiguring an item by removing a static component of the item are associated with a sixth portion of item reconfiguration data.

In some embodiments, the item reconfiguration device is configured to generate item reconfiguration data using a field item feature structure and at least one of a plurality of reconfiguration machine learning components of the composite machine learning model. In some embodiments, the plurality of reconfiguration machine learning components includes a first item material reconfiguration machine learning component. In this regard, in some embodiments, the first item material reconfiguration machine learning component is configured to process a field item feature structure to generate at least the first portion of item reconfiguration data. In some embodiments, the first portion of item reconfiguration data includes one or more items of data representative and/or indicative of one or more predicted reconfigurations of an item that include reconfiguring an item by replacing a first resin component of the item with a second resin component. In this regard, for example, the first item material reconfiguration machine learning component is configured to determine one or more predicted reconfigurations of an item that include reconfiguring an item by replacing a first resin component of the item with a second resin component.

In some embodiments, the first item material reconfiguration machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the first portion of item reconfiguration data. In this regard, in some embodiments, the first item material reconfiguration machine learning component of the composite machine learning model may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the first item material reconfiguration machine learning component may be configured to process a field item feature structure to identify a first resin component of an item using an optical character recognition technique to identify the first resign component from an item configuration feature associated with the field item feature structure that is indicative of an item schematic.

In some embodiments, the plurality of reconfiguration machine learning components includes a second item material reconfiguration machine learning component. In some embodiments, the second item material reconfiguration machine learning component is configured to process a field item feature structure to generate at least the second portion of item reconfiguration data. In some embodiments, the second portion of item reconfiguration data includes one or more items of data representative and/or indicative of one or more predicted reconfigurations of an item that include reconfiguring an item by replacing a first metal component of the item with a second metal component. In this regard, for example, the second item material reconfiguration machine learning component is configured to determine one or more predicted reconfigurations of an item that include reconfiguring an item by replacing a first metal component of the item with a second metal component.

In some embodiments, the second item material reconfiguration machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the second portion of item reconfiguration data. In this regard, in some embodiments, the second item material reconfiguration machine learning component of the composite machine learning model may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the second item material reconfiguration machine learning component may be configured to process a field item feature structure to identify a second metal component of an item using a clustering technique associated with one or more item configuration features associated with the field item feature structure, such as item configuration features that include a yield strength of an item, a density of an item, a weight of an item, and/or the like.

In some embodiments, the plurality of reconfiguration machine learning components includes an item component standardization machine learning component. In some embodiments, the item component standardization machine learning component is configured to process a field item feature structure to generate at least the third portion of item reconfiguration data. In some embodiments, the third portion of item reconfiguration data includes one or more items of data representative and/or indicative of one or more predicted reconfigurations of an item that include reconfiguring an item by standardizing one or more components of the item. In this regard, for example, the item component standardization machine learning component is configured to determine one or more predicted reconfigurations of an item that include reconfiguring an item by standardizing one or more components of the item.

In some embodiments, the item component standardization machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the third portion of item reconfiguration data. In this regard, in some embodiments, the item component standardization machine learning component of the composite machine learning model may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the item component standardization machine learning component may be configured to process a field item feature structure to identify standard components (e.g., a standard fastener component) corresponding to non-standard components of an item using a clustering technique.

In some embodiments, the plurality of reconfiguration machine learning components includes an item matching machine learning component. In some embodiments, the item matching machine learning component is configured to process a field item feature structure to generate at least the fourth portion of item reconfiguration data. In some embodiments, the fourth portion of item reconfiguration data includes one or more items of data representative and/or indicative of one or more predicted reconfigurations of an item that include reconfiguring an item by standardizing one or more dimensions of an item. In this regard, for example, the item matching machine learning component is configured to determine one or more predicted reconfigurations of an item that include reconfiguring an item by standardizing one or more dimensions of an item.

In some embodiments, the item matching machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the fourth portion of item reconfiguration data. In this regard, in some embodiments, the item matching machine learning component of the composite machine learning model may be configured to utilize one or more of any type of machine learning, rules-based, and/or artificial intelligence techniques including one or more of computer vision techniques, supervised learning (e.g., using user feed-back), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the item matching machine learning component may be configured to process a field item feature structure to identify one or more standard dimensions of an item using a clustering technique associated with one or more item configuration features associated with the field item feature structure.

In some embodiments, the plurality of reconfiguration machine learning components includes an item formation machine learning component. In some embodiments, the item formation machine learning component is configured to process a field item feature structure to generate at least the fifth portion of item reconfiguration data. In some embodiments, the fifth portion of item reconfiguration data includes one or more items of data representative and/or indicative of one or more predicted reconfigurations of an item that include reconfiguring an item by altering one or more manufacturing operations associated with the item. In this regard, for example, the item formation machine learning component is configured to determine one or more predicted reconfigurations of an item that include reconfiguring an item by altering one or more manufacturing operations associated with the item.

In some embodiments, the item formation machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the fifth portion of item reconfiguration data. In this regard, in some embodiments, the item formation machine learning component of the composite machine learning model may be configured to utilize one or more of any type of machine learning, rules-based, and/or artificial intelligence techniques including one or more of computer vision techniques, supervised learning (e.g., using user feed-back), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the item formation machine learning component may be configured to process a field item feature structure to identify whether an item was generated using a punching manufacturing operation, a pressing manufacturing operation, and/or a forming manufacturing operation by using an optical character recognition technique associated with an item configuration feature indicative of an item schematic.

In some embodiments, includes a static item component machine learning component. In some embodiments, the static item component machine learning component is configured to process a field item feature structure to generate at least the sixth portion of item reconfiguration data. In some embodiments, the sixth portion of item reconfiguration data includes one or more items of data representative and/or indicative of one or more predicted reconfigurations of an item that include reconfiguring an item by removing a static component of an item. In this regard, for example, the static item component machine learning component is configured to determine one or more predicted reconfigurations of an item that include reconfiguring an item by removing a static component of an item.

In some embodiments, the static item component machine learning component of the composite machine learning model may be a data entity that describes parameters, hyper-parameters, and/or defined operations of a rules-based, machine learning model, and/or generative artificial intelligence model (e.g., model including at least one of one or more rule-based layers, one or more layers that depend on trained parameters, coefficients, and/or the like) configured to generate the sixth portion of item reconfiguration data. In this regard, in some embodiments, the static item component machine learning component of the composite machine learning model may be configured to utilize one or more of any type of machine learning, rules-based, and/or artificial intelligence techniques including one or more of computer vision techniques, supervised learning (e.g., using user feed-back), unsupervised learning, semi-supervised learning, reinforcement learning, computer vision techniques, sequence modeling techniques, language processing techniques, neural network techniques, clustering techniques, fuzzy similarity techniques, optical character recognition techniques, and/or generative artificial intelligence techniques. For example, the static item component machine learning component may be configured to process a field item feature structure to identify static component of an item using one of the above techniques.

As shown in block 510, the method 500 may include initiating performance of one or more item reconfiguration actions based on the item reconfiguration data. As described above, in some embodiments, the item reconfiguration device is configured to initiate performance of one or more item reconfiguration actions based on item reconfiguration data, item feature data, a field item feature structure, and/or the like.

As shown in block 512, the method 500 may include determining the one or more field item predictions by applying the item feature data to an item data hub machine learning component of the composite machine learning model. As described above, in some embodiments, a field item prediction is a data object that is representative and/or indicative of an item configuration feature that is not represented in the item feature data and is determined by the item reconfiguration device. Said differently, for example, by determining one or more field item predictions, the item reconfiguration device may be configured to use item feature data that represents at least some of the item configuration features associated with an item to determine and/or predict other item configuration features associated with a particular item. In some embodiments, the item reconfiguration device is configured to determine one or more field item predictions by applying item feature data to the item data hub machine learning component.

In some embodiments, the item data hub machine learning component of the composite machine learning model may be a data entity that describes parameters, hyperparameters, and/or defined operations of a rules-based, machine learning model, and/or generative artificial intelligence model (e.g., model including at least one of one or more rule-based layers, one or more layers that depend on trained parameters, coefficients, and/or the like) configured to determine one or more field item predictions. In this regard, in some embodiments, the item data hub machine learning component of the composite machine learning model may be configured to utilize one or more of any type of machine learning, rules-based, and/or artificial intelligence techniques including one or more of computer vision techniques, supervised learning (e.g., using user feedback), unsupervised learning, semi-supervised learning, reinforcement learning, computer vision techniques, sequence modeling techniques, language processing techniques, neural network techniques, and/or generative artificial intelligence techniques. In this regard, in some embodiments, the item data hub machine learning component of the composite machine learning model is configured to determine and/or predict one or more field item predictions that that are not possible to determine and/or predict using existing databases, existing computing devices, and/or associated data transformation techniques. For example, the item data hub machine learning component of the composite machine learning model may be configured to determine and/or predict one or more field item predictions that are not possible using inner joins, outer joins, right joins, and/or left joins in an existing SQL database.

Referring now to FIG. 6, a flowchart providing an example method 600 is illustrated. In this regard, FIG. 6 illustrates operations that may be performed by the internal item feature database 150, the external item feature database 170, the item reconfiguration device 140, the user device 160, and/or the like. In some embodiments, the method 600 includes operations for initiating performance of one or more item reconfiguration actions. In some embodiments, the example method 600 defines a process, which may be executable by any of the device(s) and/or system(s) embodied in hardware, software, firmware, and/or a combination thereof, as described herein. In some embodiments, computer program code including one or more computer-coded instructions are stored to at least one non-transitory computer-readable storage medium, such that execution of the computer program code initiates performance of the method 600.

As shown in block 602, the method 600 may include generating an item reconfiguration interface component. As described above, in some embodiments, the item reconfiguration interface component includes an item feature interface element configured to display item feature data. In some embodiments, the item reconfiguration interface component includes an item reconfiguration interface element configured to display item reconfiguration data. In some embodiments, the item reconfiguration interface component includes an item visualization interface element configured to display a visual representation of an item that is a candidate for reconfiguration. For example, the item visualization interface element may be configured to display a visual representation of an item as the item currently is and/or what the item would appear like after the item has been reconfigured in accordance with item reconfiguration data generated by the item reconfiguration device.

As shown in block 604, the method 600 may include causing the item reconfiguration interface component to be rendered to an item reconfiguration interface. As described above, in some embodiments, the item reconfiguration interface may be provided on item reconfiguration device. Additionally, or alternatively, the item reconfiguration interface may be provided on the user device. Additionally, or alternatively, the item reconfiguration interface may be provided on one or more other devices, such as a remote device.

As shown in block 606, the method 600 may include causing an item inventory record to be modified. As described above, in some embodiments, an item inventory record is a record that indicates all of the components that are included in an item. In this regard, for example, an item inventory record may be modified to remove a component from an item inventory record when item reconfiguration data includes one or more items of data representative and/or indicative of one or more predicted reconfigurations of an item that includes reconfiguring an item by replacing a first component of the item with a second component (e.g., removing the first component). In some embodiments, a second component may replace a first component when the first component of the item is becoming obsolete. In this regard, in some embodiments, the item reconfiguration device is configured to determine if the first component and/or the second component is obsolete. As another example, for example, an item inventory record may be modified to add a component to an item inventory record when item reconfiguration data includes one or more items of data representative and/or indicative of one or more predicted reconfigurations of an item that includes reconfiguring an item by replacing a first component of the item with a second component (e.g., adding the first component). As another example, an item inventory record may be modified to remove a component from an item inventory record when item reconfiguration data includes one or more items of data representative and/or indicative of one or more predicted reconfigurations of an item that includes reconfiguring an item by replacing non-standard components with standard components (e.g., remove the non-standard components). As another example, an item inventory record may be modified to add a component to an item inventory record when item reconfiguration data includes one or more items of data representative and/or indicative of one or more predicted reconfigurations of an item that includes reconfiguring an item by replacing non-standard components with standard components (e.g., add the standard components). In some embodiments, modifying an item inventory record to remove a component may cause a transmission to be sent to a supplier to cancel an order for a removed component.

Additionally, or alternatively, modifying an item inventory record to add a component may cause a transmission to be sent to a supplier to place an order for an added component. As another example, an item inventory record may be modified to remove a component from an item inventory record when item reconfiguration data includes one or more items of data representative and/or indicative of the component being obsolete. In this way, for example, the obsolete component may no longer be considered as a possible component to be included in an item.

As shown in block 608, the method 600 may include causing an item manufacturing procedure to be modified. As described above, in some embodiments, an item manufacturing procedure is a series of steps that are performed to generate and/or create an item. For example, an item manufacturing procedure may be a series of one or more manufacturing operations that are performed to generate and/or create an item. In this regard, in some embodiments, causing an item manufacturing procedure to be modified includes modifying an item manufacturing procedure by removing manufacturing operations, simplifying manufacturing operations, combining manufacturing operations, replacing manufacturing operations, adding manufacturing operations, and/or the like. For example, an item manufacturing procedure may be modified by altering one or more manufacturing operations in the item manufacturing procedure by replacing a stamped metal manufacturing operation with a plastic formation manufacturing operation.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

The invention claimed is:

1. A method comprising:

receiving item feature data representative of a plurality of item configuration features associated with a plurality of items, wherein a first part of the item feature data is received from an internal item feature database and a second part of the item feature data is received from an external item feature database;

generating a field item feature structure, wherein the field item feature structure comprises at least a portion of the item feature data and one or more field item predictions;

identifying an item of the plurality of items using the field item feature structure and an item reconfiguration candidate machine learning component of a composite machine learning model, wherein the item of the plurality of items is a candidate for reconfiguration;

generating item reconfiguration data for the item of the plurality of items using the field item feature structure and at least one of a plurality of reconfiguration machine learning components of the composite machine learning model; and initiating performance of one or more item reconfiguration actions based on the item reconfiguration data.

2. The method of claim 1, further comprising:

determining the one or more field item predictions by applying the item feature data to an item data hub machine learning component of the composite machine learning model.

3. The method of claim 1, wherein the plurality of reconfiguration machine learning components comprises a first item material reconfiguration machine learning component configured to determine a predicted reconfiguration of the item, wherein the predicted reconfiguration of the item comprises replacing a first component of the item with a second component, wherein the first component is a resin component of the item.

4. The method of claim 1, wherein the plurality of reconfiguration machine learning components comprises a second item material reconfiguration machine learning component configured to determine a predicted reconfiguration of the item, wherein the predicted reconfiguration of the item comprises replacing a first component of the item with a second component, wherein the first component is a metal component of the item.

5. The method of claim 1, wherein the plurality of reconfiguration machine learning components comprises an item component standardization machine learning component configured to determine a predicted reconfiguration of the item, wherein the predicted reconfiguration of the item comprises standardizing one or more components of the item.

6. The method of claim 1, wherein the plurality of reconfiguration machine learning components comprises an item matching machine learning component configured to determine a predicted reconfiguration of the item, wherein the predicted reconfiguration of the item comprises standardizing one or more dimensions of the item.

7. The method of claim 1, wherein the plurality of reconfiguration machine learning components comprises an item formation machine learning component configured to determine a predicted reconfiguration of the item, wherein the predicted reconfiguration of the item comprises altering one or more manufacturing operations associated with the item.

8. The method of claim 1, wherein the plurality of reconfiguration machine learning components comprises a static item component machine learning component configured to determine a predicted reconfiguration of the item, wherein the predicted reconfiguration of the item comprises removing a static component of the item.

9. The method of claim 1, wherein initiating performance of the one or more item reconfiguration actions comprises:

generating an item reconfiguration interface component, wherein the item reconfiguration interface component comprises one or more of the item feature data, the item reconfiguration data, or a visual representation of the item; and causing the item reconfiguration interface component to be rendered to an item reconfiguration interface.

10. The method of claim 1, wherein initiating performance of the one or more item reconfiguration actions comprises:

causing an item inventory record to be modified.

11. The method of claim 1, wherein initiating performance of the one or more item reconfiguration actions comprises:

causing an item manufacturing procedure to be modified.

12. An apparatus comprising memory and one or more processors communicatively coupled to the memory, the one or more processors configured to:

receive item feature data representative of a plurality of item configuration features associated with a plurality of items, wherein a first part of the item feature data is received from an internal item feature database and a second part of the item feature data is received from an external item feature database;

generate a field item feature structure, wherein the field item feature structure comprises at least a portion of the item feature data and one or more field item predictions;

identify an item of the plurality of items using the field item feature structure and an item reconfiguration candidate machine learning component of a composite machine learning model, wherein the item of the plurality of items is a candidate for reconfiguration;

generate item reconfiguration data for the item of the plurality of items using the field item feature structure and at least one of a plurality of reconfiguration machine learning components of the composite machine learning model; and initiate performance of one or more item reconfiguration actions based on the item reconfiguration data.

13. The apparatus of claim 12, whether the one or more processors are further configured to:

determine the one or more field item predictions by applying the item feature data to an item data hub machine learning component of the composite machine learning model.

14. The apparatus of claim 12, wherein the plurality of reconfiguration machine learning components comprises a first item material reconfiguration machine learning component configured to determine a predicted reconfiguration of the item, wherein the predicted reconfiguration of the item comprises replacing a first component of the item with a second component, wherein the first component is a resin component of the item.

15. The apparatus of claim 12, wherein the plurality of reconfiguration machine learning components comprises a second item material reconfiguration machine learning component configured to determine a predicted reconfiguration of the item, wherein the predicted reconfiguration of the item comprises replacing a first component of the item with a second component, wherein the first component is a metal component of the item.

16. The apparatus of claim 12, wherein the plurality of reconfiguration machine learning components comprises an item component standardization machine learning component configured to determine a predicted reconfiguration of the item, wherein the predicted reconfiguration of the item comprises standardizing one or more components of the item.

17. The apparatus of claim 12, wherein the plurality of reconfiguration machine learning components comprises an item matching machine learning component configured to determine a predicted reconfiguration of the item, wherein the predicted reconfiguration of the item comprises standardizing one or more dimensions of the item.

18. The apparatus of claim 12, wherein the plurality of reconfiguration machine learning components comprises an item formation machine learning component configured to determine a predicted reconfiguration of the item, wherein the predicted reconfiguration of the item comprises altering one or more manufacturing operations associated with the item.

19. The apparatus of claim 12, wherein the plurality of reconfiguration machine learning components comprises a static item component machine learning component configured to determine a predicted reconfiguration of the item, wherein the predicted reconfiguration of the item comprises removing a static component of the item.

20. A computer program product comprising at least one non-transitory computer-readable storage medium having computer program code stored thereon that, in execution with at least one processor, configures the computer program product for:

receiving item feature data representative of a plurality of item configuration features associated with a plurality of items, wherein a first part of the item feature data is received from an internal item feature database and a second part of the item feature data is received from an external item feature database;

generating a field item feature structure, wherein the field item feature structure comprises at least a portion of the item feature data and one or more field item predictions;

identifying an item of the plurality of items using the field item feature structure and an item reconfiguration candidate machine learning component of a composite machine learning model, wherein the item of the plurality of items is a candidate for reconfiguration;

generating item reconfiguration data for the item of the plurality of items using the field item feature structure and at least one of a plurality of reconfiguration machine learning components of the composite machine learning model; and initiating performance of one or more item reconfiguration actions based on the item reconfiguration data.

\* \* \* \* \*